(12) United States Patent
Etoh et al.

(10) Patent No.: US 8,098,940 B2
(45) Date of Patent: Jan. 17, 2012

(54) METHOD OF AND APPARATUS FOR ENCODING SIGNALS, AND METHOD OF AND APPARATUS FOR DECODING THE ENCODED SIGNALS

(75) Inventors: Minoru Etoh, Yokohama (JP); Mitsuru Kobayashi, Yokohama (JP); Shunichi Sekiguchi, Yamato (JP)

(73) Assignee: NTT DoCoMo, Inc., Tokyo (JP)

( * ) Notice: Subject to any disclaimer, the term of this patent is extended or adjusted under 35 U.S.C. 154(b) by 1349 days.

(21) Appl. No.: 11/683,822

(22) Filed: Mar. 8, 2007

(65) Prior Publication Data

US 2007/0189624 A1     Aug. 16, 2007

Related U.S. Application Data

(63) Continuation of application No. 10/297,492, filed as application No. PCT/JP02/03499 on Apr. 8, 2002, now Pat. No. 7,242,814.

(30) Foreign Application Priority Data

Apr. 9, 2001 (JP) .................................. 2001-110664

(51) Int. Cl.
*G06K 9/36* (2006.01)
(52) U.S. Cl. ......... 382/232; 382/233; 382/236; 382/248
(58) Field of Classification Search .................. 382/232, 382/245, 248, 250, 236; 375/240.02, 240.03, 375/E7.129, E7.137; 73/589; 706/13, 903; 702/189; 367/125
See application file for complete search history.

(56) References Cited

U.S. PATENT DOCUMENTS

| | | | |
|---|---|---|---|
| 6,097,843 A | 8/2000 | Takashima et al. | 382/232 |
| 6,636,637 B1 | 10/2003 | Kaup | 382/232 |

FOREIGN PATENT DOCUMENTS

| | | |
|---|---|---|
| JP | 62-053026 | 3/1987 |
| JP | 2-070126 | 3/1990 |
| JP | 4-072960 | 3/1992 |
| JP | 07-170523 | 7/1995 |
| JP | 08-223581 | 8/1996 |
| WO | WO 98/34406 | 8/1998 |

(Continued)

OTHER PUBLICATIONS

Yurij S. Musatenko, et al., "Video coding using Karhunen-Loeve transform and motion compensation", Proceedings of the Spie, Spie, Bellingham,VA, vol. 3716, Jan. 1, 1999, XP000933495, ISSN: 0277-786X, pp. 233-243.

(Continued)

*Primary Examiner* — Anh Hong Do
(74) *Attorney, Agent, or Firm* — Oblon, Spivak, McClelland, Maier & Neustadt, L.L.P.

(57) ABSTRACT

A method of and an apparatus for encoding and decoding using transformation bases of a yet higher efficiency. In a method for encoding an object signal in compliance with a transformation rule, a signal correlating to the object signal is obtained, and a transformation base that forms the transformation rule is derived based on a characteristic of the obtained reference signal. The object signal is transformed and encoded in compliance with the transformation rule based on the derived transformation base. Accordingly, the object signal is transformed in compliance with the transformation rule based on the transformation base derived from the characteristic of the reference signal. Since the reference signal is correlated to the object signal, the transformation base derived from the characteristic matches the feature of the object signal.

89 Claims, 29 Drawing Sheets

FOREIGN PATENT DOCUMENTS

WO          00-02393          1/2000

OTHER PUBLICATIONS

Ralph Neff, et al., "Very Low Bit-Rate Video Coding Based on Matching Pursuits", IEEE Transactions on Circuits and Systems for Video Technology, IEEE Service Center, Piscataway, NJ, US, vol. 7, No. 1, Feb. 1, 1997, XP011014358, ISSN: 1051-8215, pp. 158-171.

Jechang Jeong, et al., "Adaptive Huffman coding of 2-D DCT coefficients for image sequence compression", Signal Processing., Image Communication, Elsevier Science Publishers, Amsterdam, NL, vol. 7, No. 1, Mar. 1, 1995, pp. 1-11, XP004047118, ISSN: 0923-5965.

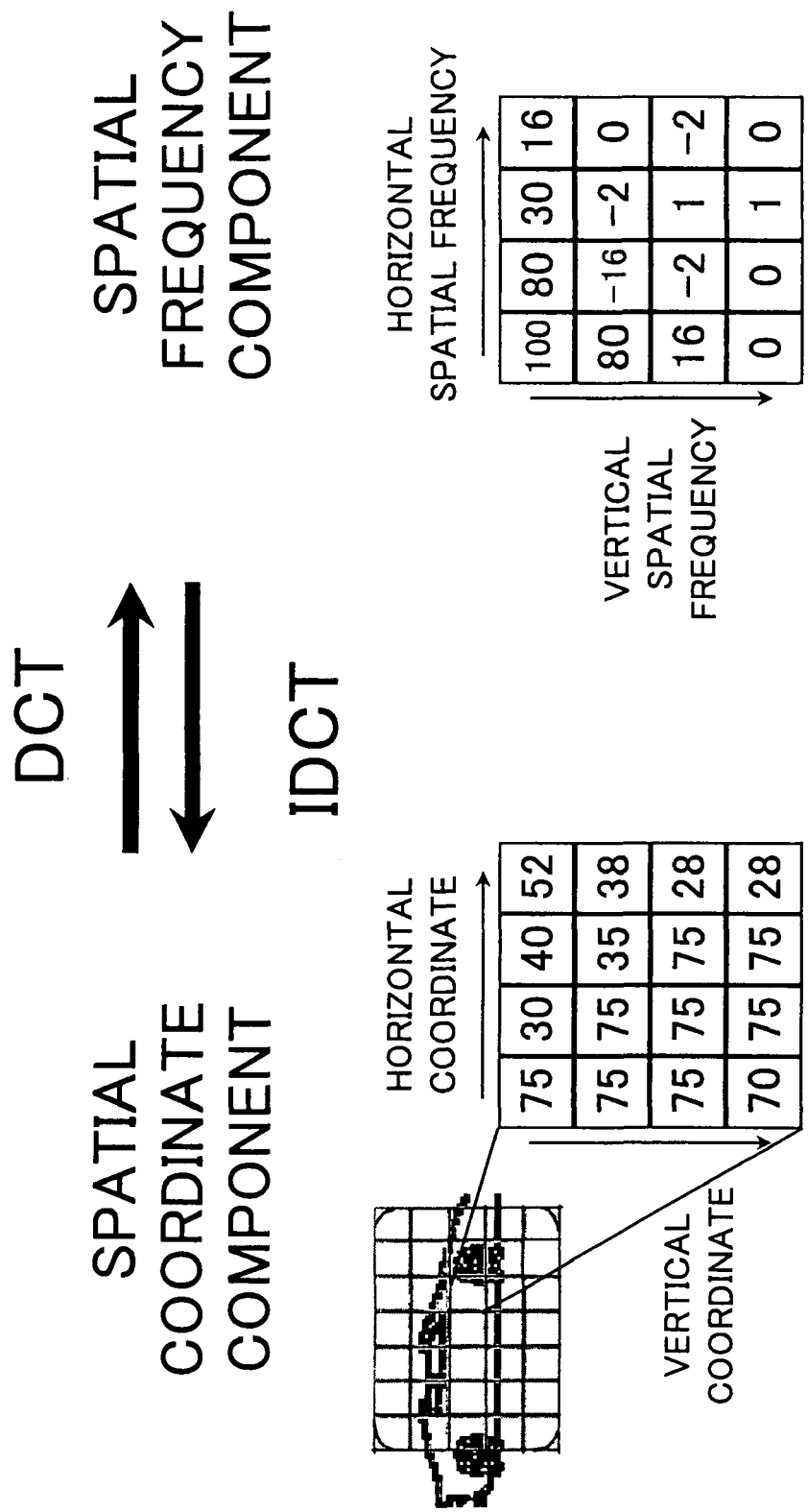

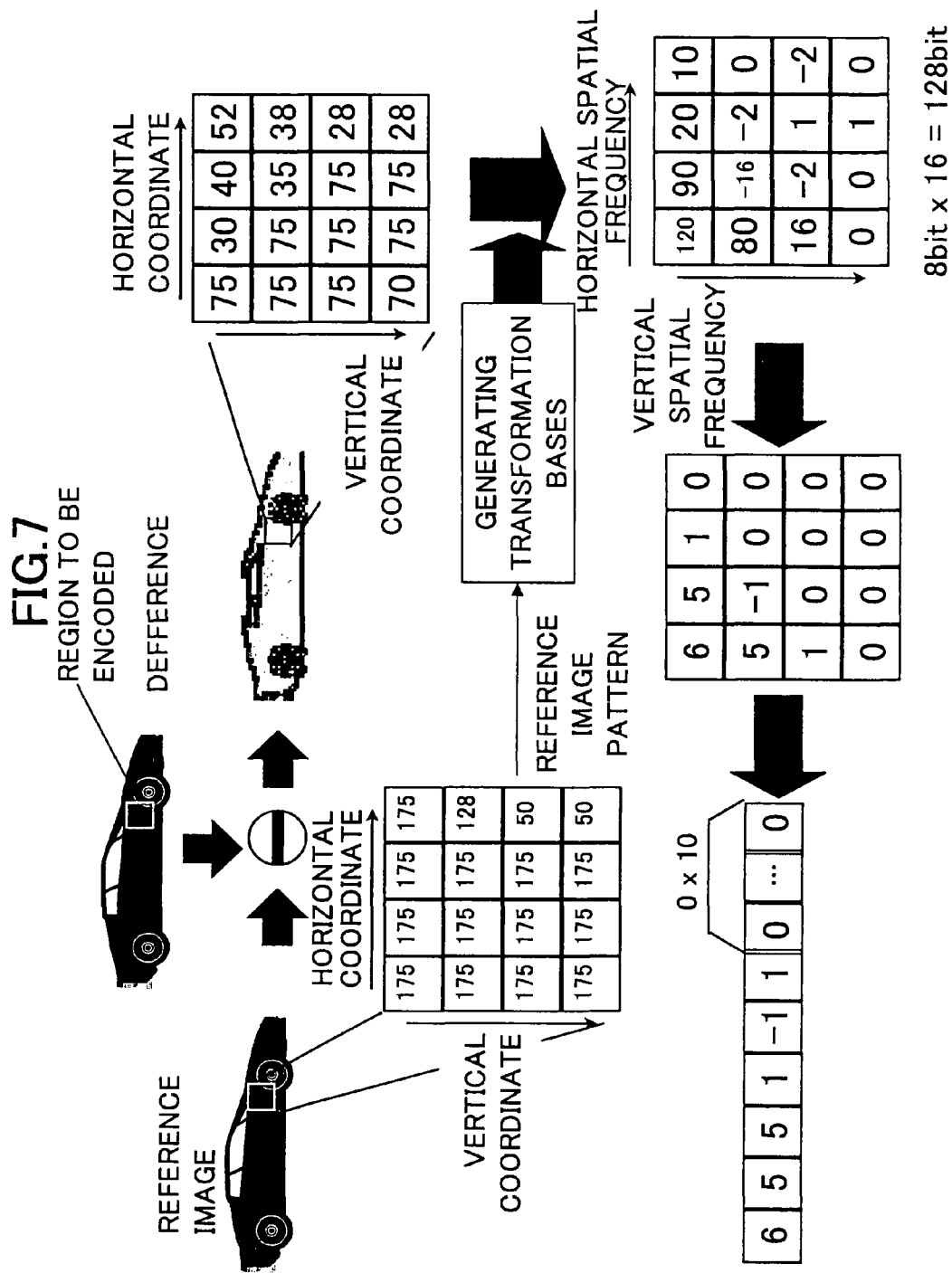

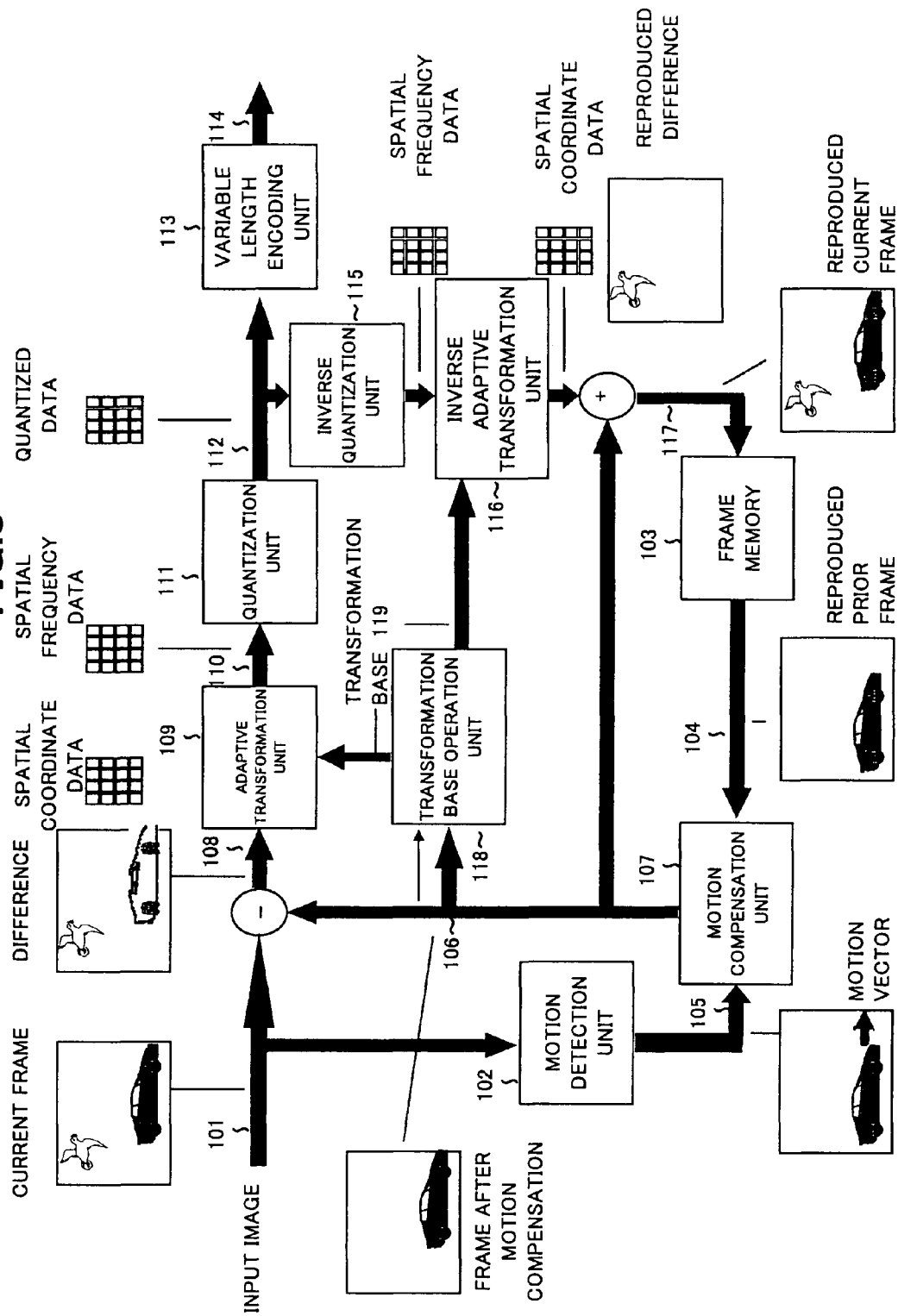

FIG.13A $$F(u) = \sqrt{\frac{2}{N}} C(u) \sum_{x=0}^{N-1} f(x) \cos \frac{\pi(2x+1)u}{2N} \quad \text{FORWARD TRANSFORMATION}$$

$$f(x) = \sqrt{\frac{2}{N}} \sum_{x=0}^{N-1} C(u) F(u) \cos \frac{\pi(2x+1)u}{2N} \quad \text{INVERSE TRANSFORMATION}$$

$$C(u) = \begin{cases} \frac{1}{\sqrt{2}} & (u=0) \\ 1 & (u \neq 0) \end{cases}$$

FIG.13B
FORWARD TRANSFORMATION MATRIX

| 13 | 13 | 13 | 13 |
|----|----|----|----|
| 17 | 7  | -7 | -17 |
| 13 | -13 | -13 | 13 |
| 7  | -17 | 17 | -7 |

FIG.13C
INVERSE TRANSFORMATION MATRIX

| 13 | 17 | 13 | 7 |
|----|----|----|----|
| 17 | 7  | -13 | -17 |
| 13 | -7 | -13 | 17 |
| 13 | -17 | 13 | -7 |

FORWARD TRANSFORMATION MATRIX

| 5  | 9   | 14  | 19  |
|----|-----|-----|-----|
| 21 | 12  | -1  | -10 |
| 13 | -13 | -13 | 13  |
| 7  | -17 | 17  | -7  |

FIG.14B

INVERSE TRANSFORMATION MATRIX

| 5  | 21  | 13  | 7   |
|----|-----|-----|-----|
| 9  | 12  | -13 | -17 |
| 14 | -1  | -13 | 17  |
| 19 | -10 | 13  | -7  |

1/26

FIG.15A FORWARD TRANSFORMATION MATRIX

| 19 | 14 | 9 | 5 |
|---|---|---|---|
| -10 | -1 | 12 | 21 |
| 13 | -13 | -13 | 13 |
| -7 | 17 | -17 | 7 |

FIG.15B INVERSE TRANSFORMATION MATRIX

| 19 | -10 | 13 | -7 |
|---|---|---|---|
| 14 | -1 | -13 | 17 |
| 9 | 12 | -13 | -17 |
| 5 | 21 | 13 | 7 |

1/26

FORWARD TRANSFORMATION MATRIX

FIG.16A

| 6 | 17 | 17 | 6 |
|---|---|---|---|
| 17 | 7 | -7 | -17 |
| -17 | 6 | 6 | -17 |
| -7 | 17 | -17 | 7 |

INVERSE TRANSFORMATION MATRIX

FIG.16B

| 6 | 17 | -17 | -7 |
|---|---|---|---|
| 17 | 7 | 6 | 17 |
| 17 | -7 | 6 | -17 |
| 6 | -17 | -17 | 7 |

1/26

FIG.17A FORWARD TRANSFORMATION MATRIX

| 17 | 6   | 6   | 17  |
|----|-----|-----|-----|
| 7  | 17  | -17 | -7  |
| 6  | -17 | -17 | 6   |
| 17 | -7  | 7   | -17 |

FIG.17B INVERSE TRANSFORMATION MATRIX

| 17 | 7   | 6   | 17  |
|----|-----|-----|-----|
| 6  | 17  | -17 | -7  |
| 6  | -17 | -17 | 7   |
| 17 | -7  | 6   | -17 |

FORWARD TRANSFORMATION MATRIX

FIG.18A

| 4 | 6 | 17 | 18 |
|---|---|----|----|
| 22 | 11 | 1 | -10 |
| 13 | -13 | -13 | 13 |
| 4 | -19 | 15 | -9 |

INVERSE TRANSFORMATION MATRIX

FIG.18B

| 4 | 22 | 13 | 4 |
|---|----|----|---|
| 6 | 11 | -13 | -19 |
| 17 | 1 | -13 | 15 |
| 18 | -10 | 13 | -9 |

1/26

FIG.19A FORWARD TRANSFORMATION MATRIX

| 18 | 17 | 6 | 4 |
|---|---|---|---|
| -10 | 1 | 11 | 22 |
| 13 | -13 | -13 | 13 |
| -9 | 15 | -19 | 4 |

FIG.19B INVERSE TRANSFORMATION MATRIX

| 18 | -10 | 13 | -9 |
|---|---|---|---|
| 17 | 1 | -13 | 15 |
| 6 | 11 | -13 | -19 |
| 4 | 22 | 13 | 4 |

1/26

METHOD OF AND APPARATUS FOR ENCODING SIGNALS, AND METHOD OF AND APPARATUS FOR DECODING THE ENCODED SIGNALS

CROSS-REFERENCE TO RELATED APPLICATIONS

This application is a continuation of U.S. patent application Ser. No. 10/297,492, filed Dec. 9, 2002, now U.S. Pat. No. 7,242,814 which is a National Stage Application of PCT Application No. PCT/JP02/03499, filed Apr. 8, 2002, and claims priority to Japanese Application No. 2001-110664, filed Apr. 9, 2001. The entire contents of U.S. patent application Ser. No. 10/297,492 are incorporated herein by reference in their entirety.

The present invention generally relates to a method of and an apparatus for encoding and decoding a series of signals, and more particularly, to a method of and an apparatus for encoding and decoding a series of signals using a transformation basis as DCT.

BACKGROUND OF THE INVENTION

Conventionally, an image encoding apparatus and an image decoding apparatus based on MPEG-1 encoding method are disclosed in Le Gall, D. "MPEG: A Video Compression Standard for Multimedia Applications" (Trans. ACM, 1991, April). The image encoding apparatus is constructed as showed in FIG. 1, and the image decoding system is constructed as showed in FIG. 2.

The image encoding apparatus showed in FIG. 1 reduces redundancy in the time directions by motion compensating inter-frame prediction, and further reduces redundancy remaining in the spatial directions by DCT (Discrete Cosine Transform) to compress an image signal. FIG. 3 shows motion compensating inter-frame prediction; FIG. 4 shows block matching method frequently used to detect a motion vector; FIG. 5 shows the concept of DCT; and FIG. 6A shows the principle of encoding DCT coefficients. The operations of the image encoding apparatus and the image decoding apparatus showed in FIGS. 1 and 2, respectively, will be described by reference to these drawings.

An input image signal 1 is a time series of framed images and, hereinafter, refers to a signal by a framed image. A framed image to be encoded will be called a current frame as showed in FIG. 3. The current frame is divided into 16 pixels× 16 lines square regions (hereinafter referred to as a "macro block"), for example, and dealt with as follows.

The macro block data (current macro block) of the current frame are sent to motion detection unit 2 to detect a motion vector 5. A pattern similar to the current macro block is selected from patterns in a predetermined search region of encoded framed images 4 (hereinafter called partially decoded images) stored in a frame memory 3, and the motion vector 5 is generated based on the spatial distance between the selected pattern and the current macro block.

The above partially decoded image is not limited to frames in the past. It is possible to use frames in the future by encoding them in advance and storing them in a frame memory. The use of the future frames increases time required for processing since the order of encoding needs to be switched. The use of the future frames, however, further reduces redundancy in the time directions effectively. Generally, in the case of MPEG-1, the following encoding types are selectively available: bi-directional prediction using both a past frame and a future frame (B-frame prediction); prior-directional prediction using only a prior frame (P-frame prediction); and I-frame that performs encoding without prediction. In FIG. 3 showing the case of P-frame prediction, the partially decoded image is indicated as a prior frame.

The motion vector 5 is represented by a two dimensional translation. The motion vector 5 is usually detected by block matching method showed in FIG. 4. A search range centered at the spatial position of the current macro block is provided, and motion is searched in the motion search range. A motion prediction datum is defined as a block that minimizes the sum of squared differences or the sum of absolute differences selected from the image data in the motion search range of the prior frame. The motion vector 5 is determined as the quantity of positional change between the current macro block and the motion prediction data. A motion prediction datum is obtained for each macro block of the current frame. The motion prediction data represented as a frame image corresponds to a motion prediction frame of FIG. 3. For the motion compensation inter-frame prediction, a difference between the motion prediction frame and the current frame is obtained, and the remainder signal (hereinafter referred to as prediction remainder signal 8) is encoded by DCT encoding method as showed in FIG. 3.

Specifically, a motion compensation unit 7 identifies the motion prediction datum of each macro block (hereinafter referred to as prediction image). That is, this motion compensation unit 7 generates a prediction image 6 from the partially decoded image 4 stored in the frame memory 3 using the motion vector 5.

The prediction remainder signal 8 is converted into a DCT coefficient datum by a DCT unit 9. As showed in FIG. 5, DCT converts a spatial pixel vector into a combination of normal orthogonal bases each representing a fixed frequency element. A block of 8×8 pixels (hereinafter referred to as a DCT block) is usually employed as a spatial pixel vector. Since DCT is a separation type conversion, each eight dimensional horizontal row vector of a DCT block is separately converted, and each eight dimensional vertical column vector of a DCT block is separately converted. DCT localizes power concentration ratio in a DCT block using the inter-pixel correlation existing in the spatial region. The higher the power concentration ratio is, the more efficient the conversion is. In the case of a natural image signal, the performance of DCT is as high as that of KL transformation that is the optimum conversion. Especially, the electric power of a natural image is mainly concentrated in a low frequency range and little distributed to the high frequency range. Accordingly, as showed in FIG. 6B, the quantization coefficients are scanned in the DCT block in a direction from a low frequency to a high frequency. Since the scanned data includes many zero runs, the total encoding efficiency including the effect of entropy encoding is improved.

A quantization unit 11 quantizes the DCT coefficients 10. The quantized coefficients 12 are scanned by a variable length encoding unit 13 and converted into a run-length code that is multiplexed on a compressed stream 14 and transmitted. In addition, the motion vector 5 detected by the motion detection unit 2 is multiplexed on the compressed stream 14 by a macro block and transmitted for the generation by a image decoding apparatus of the same prediction image as that generated by the image encoding apparatus.

A quantized coefficient 12 is partially decoded via an inverse quantization unit 15 and an inverse DCT unit 16. The result is added to the predicted image 6 to generate a decoded image 17 that is the same as a decoded image data generated by the image decoding apparatus. The decoded image 17 is stored in the frame memory 3 as the partially decoded image to be used for the prediction of the next frame.

The operation of an image decoding apparatus showed in FIG. 2 will be described below.

This image decoding apparatus, after receiving a compressed stream 14, detects a sync word indicating the top of each frame by a variable length decoding unit 18 and restores the motion vector 5 and the quantized DCT coefficient 12 by a macro block. The motion vector 5 is transferred to the motion compensation unit 7 that extracts a portion of image stored in a frame memory 19 (that is used in the same manner as the frame memory 3) that moved for the motion vector 5 as the prediction image 6. The quantized DCT coefficient 12 is restored through a inverse quantization unit 15 and a inverse DCT unit 16, and then, added to the predicted image 6 to make the final decoded image 17. The decoded image 17 is output to a display device at a predetermined timing to reproduce the image.

Encoding algorisms such as MPEG motion picture encoding that utilize a correlation of a signal that has already been decoded (hereinafter referred to as a reference image or a prediction image) are widely employed as described in connection with the conventional example described above. DCT is frequently used as the transformation base because of the reasons described above. DCT is effective for encoding signal waveforms the prior probability distribution of which is unknown. However, media signals such as an audio signal and an image signal are generally unsteady and spatially and temporally biased. Accordingly, in the case of the fixed transformation base described above in connection with the conventional example, the number of the bases (the number of coefficients) cannot be reduced, which poses a limit on the compression.

BRIEF SUMMARY OF THE INVENTION

Accordingly, the object of the present invention is to provide a method of and an apparatus for encoding and decoding using transformation bases at even higher efficiency.

To achieve the above objects, a method of encoding an object signal in compliance with a transformation rule, as described in claim 1, includes a first step of obtaining a reference signal correlating to said object signal, a second step of deriving a transformation base that forms said transformation rule based on a characteristic of the obtained reference signal, and a third step of encoding said object signal in compliance with the transformation rule formed by the derived transformation base.

The method of encoding a signal as described above, the object signal is transformed in compliance with the transformation rule based on the transform base derived based on the characteristic of the reference signal. Since this reference signal correlates to the object signal, the derived transformation base matches the feature of the object signal.

The above object signal is, for example, an image signal indicating information in connection with an image, a media signal such as an audio signal, and any other signal.

When the image signal is input as the object signal, it is possible to use predicted remainder signal that is obtained by motion compensation prediction method from the input original image signal as the object signal. Additionally, in the case the image signal is used as the object signal, it is possible to use predicted image signal that is obtained by motion compensation prediction method from the input image signal as the reference signal.

From the standpoint that the decoding side, even if information about the transformation base is not transmitted from the encoding side to the decoding side, can reproduce the transformation base that is used for encoding by the encoding side, as described in claim 2, said reference signal is identical to a signal that is to be obtained when the object signal encoded by the method is decoded.

The above transformation base can be generated, as described in claim 6, based on the characteristic of the reference signal. In addition, the transformation base, as described in claim 11, can be selected based on the characteristic of the reference signal from a predetermined plurality of transformation bases.

In the case where a transformation base to be used is selected from the predetermined plurality of transformation bases, the operation of the decoding side is made easy if the decoding side is provided with the same plurality of transformation bases. In this case, as described in claim 15, it is possible to construct so that information to identify the selected transformation base is encoded with the object signal. By transmitting the information to identify this encoded transformation base, the decoding side can identify a transformation base used by the decoding side from the plurality of transformation bases based on the information to identify the transformation base.

From the standpoint that the decoding side can easily obtain the transformation base used by the encoding side, the present invention, as described in claim 17, can encode the transformation base derived as described above with the object signal. Since this transformation base is encoded and transmitted to the decoding side, the decoding side can easily obtain the transformation base used by the encoding side.

In the case where an appropriate transformation is impossible with only the predetermined plurality of transformation bases, it is effective, as described in claim 18, to generate the transformation base based on the characteristic of the above reference signal, and select a transformation base to be used based on the characteristic of the reference signal from the predetermined plurality of transformation bases and the generated transformation base.

In order to avoid such a situation that an appropriate transformation base is not included in the plurality of transformation bases as much as possible, the present invention, as described in claim 19, in the case where the generated transformation base is selected as a transformation base to be used, can add the generated transformation base to the plurality of transformation bases.

In order to avoid unnecessary increase in the number of transformation bases including in the plurality of transformation bases, the present invention can be constructed, as described in claim 20, so that a transformation base determined based on said characteristic of said reference signal and a mutual relationship with another one of said plurality of transformation bases is deleted from said plurality of transformation bases.

In order to use more appropriate transformation base, the present invention is constructed, as described in claim 23, so that one of said plurality of transformation bases is selected based on said characteristic of said reference signal, and said object signal is encoded using the selected one of said plurality of transformation bases and the generated transformation base, and either the selected one of said plurality of transformation bases or the generated transformation base is selected based on results of encoding.

In order to transform the object signal by a pattern matching method such as so-called "Matching Pursuits", the present invention is constructed, as described in claim 29, so that a partial signal waveform of said object signal is identified, and said partial signal waveform is converted into similarity information indicating a similarity between said partial signal waveform and a waveform vector making a transformation vector, information to identify said waveform vector, said similarity information, and a position of said partial signal waveform in said object signal are encoded, and in said second step, a waveform vector that makes a transformation base is generated based on a characteristic of a partial signal of said reference signal corresponding to said partial signal waveform of said object signal.

To solve the above problems, an apparatus as described in claim 33, for encoding an object signal in compliance with a transformation rule, includes a first unit that obtains a reference signal correlating to said object signal, a second unit that derives a transformation base that forms said transformation rule based on a characteristic of the obtained reference signal, and a third unit that encodes said object signal in compliance with the transformation rule formed by the derived transformation base.

In addition, to achieve the above object, a method, as described in claim 62, of decoding an encoded signal and transforming the decoded signal in compliance with a transformation rule to reproduce an image signal, includes a first step of deriving a transformation base that forms said transformation rule based on the decoded signal, and a second step of transforming the decoded signal in compliance with said transformation rule based on the derived transformation base to reproduce said image signal.

From the standpoint that the decoding side can generate the transformation base, the present invention is constructed, as described in claim 63, so that, in said first step, a signal correlated to the decoded signal is obtained as a reference signal, and said transformation base is generated based on a characteristic of the obtained reference signal.

In order to make the operation of the decoding side to obtain the transformation base, the present invention is constructed, as described in claim 72, so that, in said first step, a transformation base to be used in said second step is selected from a plurality of predetermined transformation bases based on a characteristic of said reference signal.

In order to make the operation of the decoding side easier, the present invention is constructed, as described in claim 78, so that, in said first step, a transformation base obtained by decoding said encoded signal is obtained as a transformation base to be used in said second step.

Additionally, the present invention can be constructed, as described in claim 79, so that, in said first step, in the case where a first transformation base that is not included in said plurality of transformation bases is included in a signal obtained by decoding said encoded signal, said first transformation base is obtained as a transformation base to be used in said second step, and said second transformation base is added to said plurality of transformation bases.

In the method of decoding signal, in order to avoid the unnecessary increase in the number of the transformation base, the present invention can be constructed, as described in claim 80, so that, in the case where information to identify said second transformation base in said plurality of transformation bases is included in a signal obtained by decoding said encoded signal, said second transformation base is deleted from said plurality of transformation bases.

In order to replace the above second transformation base with the above first transformation base, the present invention can be constructed, as described in claim 81, so that said first transformation base is identified by information that identifies said second transformation base in said plurality of transformation bases.

In order to decode the signal that is encoded by the pattern matching method such as so-called "Matching Pursuits", the present invention can be constructed, as claimed in claim 83, in the case where information indicating that a waveform vector that makes a transformation base generated based on a characteristic of a partial signal of a predetermined reference signal has been used when an object signal is encoded, similarity information indicating a similarity between said waveform vector and said partial signal waveform of said object signal, and a position of said partial signal waveform in said object signal are included in a signal that is obtained by decoding said encoded signal, in said first step, a waveform vector making a transformation base, which is available from said encoded signal, is generated based on a characteristic of said partial signal of said reference signal corresponding to a predetermined reference signal used when said signal is encoded, in said second step, said partial signal waveform at the position in said object signal is reproduced by transforming said similarity information in compliance with said transformation rule based on the generated waveform vector.

Furthermore, in order to achieve the above object, an apparatus, as described in claim 85, for decoding an encoded signal and transforming the decoded signal in compliance with a transformation rule to reproduce an image signal, includes a first unit that derives a transformation base that forms said transformation rule based on the decoded signal, and a second unit that transforms the decoded signal in compliance with said transformation rule based on the derived transformation base to reproduce said image signal.

BRIEF DESCRIPTION OF THE DRAWINGS

FIG. 5 is a schematic diagram for explaining the concept of DCT;

FIG. 7 is a schematic diagram for explaining the principle of encoding according to an embodiment of the present invention;

FIG. 8 is a schematic diagram showing an image encoding apparatus according to the first embodiment of the present invention;

FIG. 13A is a schematic diagram showing formulae of DCT transformation;

FIGS. 13B and 13C are schematic diagrams showing DCT transformation bases;

FIGS. 14A and 14B are schematic diagrams showing transformation bases (No. 1);

FIGS. 15A and 15B are schematic diagrams showing transformation bases (No. 2);

FIGS. 16A and 16B are schematic diagrams showing transformation bases (No. 3);

FIGS. 17A and 17B are schematic diagrams showing transformation bases (No. 4);

FIGS. 18A and 18B are schematic diagrams showing transformation bases (No. 5);

FIGS. 19A and 19B are schematic diagrams showing transformation bases (No. 6);

DETAILED DESCRIPTION OF THE INVENTION

A description on embodiments of the present invention will be given below by reference to the drawings.

If transformation bases can be modified depending on the pattern of image, and transformation bases that fit the local signal distribution of the image are used, the number of coefficients to be encoded is reduced, and the efficiency of the encoding can be improved. The image decoding apparatus can use a reference image to modify the transformation bases because the reference image does not need to be transmitted as additional information from the image encoding apparatus to the image decoding apparatus, and the reference image reflects the pattern of signal to be encoded (FIG. 7).

As showed in FIG. 7, a waveform pattern of the original image or the reference image, in the case of the boundary of an object, for example, to which the motion model does not fit, remains in the prediction remainder signal generated by motion compensation inter-frame prediction. Especially, an electric power often concentrates to an edge portion (the outline of a car showed in FIG. 7, for example). DCT requires many non-zero coefficients to express such a pattern since the transformation bases of DCT are fixed. Accordingly, as showed in FIG. 7, it is necessary to modify the fixed transformation bases of DCT based on the pattern of a reference image to generate new transformation bases. The new transformation bases are generated so that, in the case where the reference pattern includes a steep step edge, a transformation base that can best represent the step edge on behalf of a DC element is set as a principal axis. Because these newly generated transformation bases are used instead of the fixed transformation bases of DCT, the principle axis is set in accordance with the local frequency distribution of the signal instead of a DC element of DCT, and the concentration ratio of the electric power increases.

As described above, an image encoding apparatus and an image decoding apparatus according to an embodiment of the present invention are constructively provided with a means for modifying the transformation bases so that the concentration ratio of the electric power of each signal to be encoded is increased using the correlation between the signal to be encoded (predicted remainder signal) and the reference signal that well reflects the pattern of the signal to be encoded. Accordingly, the signal is represented by fewer coefficients, which results in a higher compression ratio.

The first embodiment of the present invention will be described as below.

Figure 9:
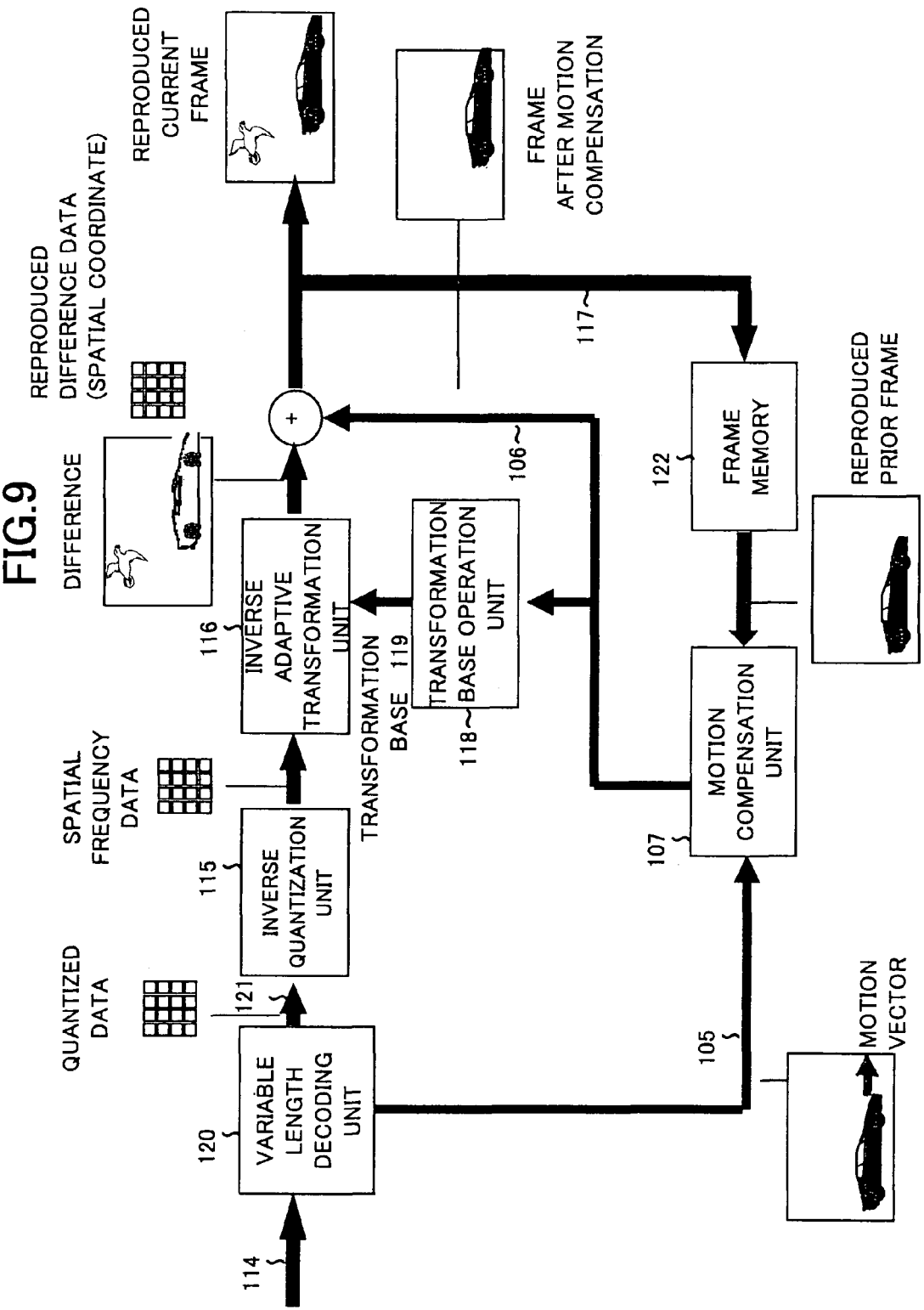
FIG. 9 is a schematic diagram showing an image decoding apparatus according to the first embodiment of the present invention.

An image encoding apparatus according to this embodiment is constructed as showed in FIG. 8, for example, and an image decoding apparatus according to this invention is constructed as showed in FIG. 9, for example. In the present embodiment, redundancy in the temporal direction is reduced by motion compensation inter-frame prediction. The DCT transformation bases are modified so that the waveform pattern of predicted image of the macro block obtained by the motion compensation prediction is captured. The signal is encoded and compressed by the modified transformation bases. The modification of the transformation bases for each pattern of the predicted image requires additional operations. The image encoding apparatus, however, does not need to transmit additional information in connection with the modification of the transformation bases to the image decoding apparatus since the operation is performed using the predicted image data that are shared with the image decoding apparatus.

Figure 1:
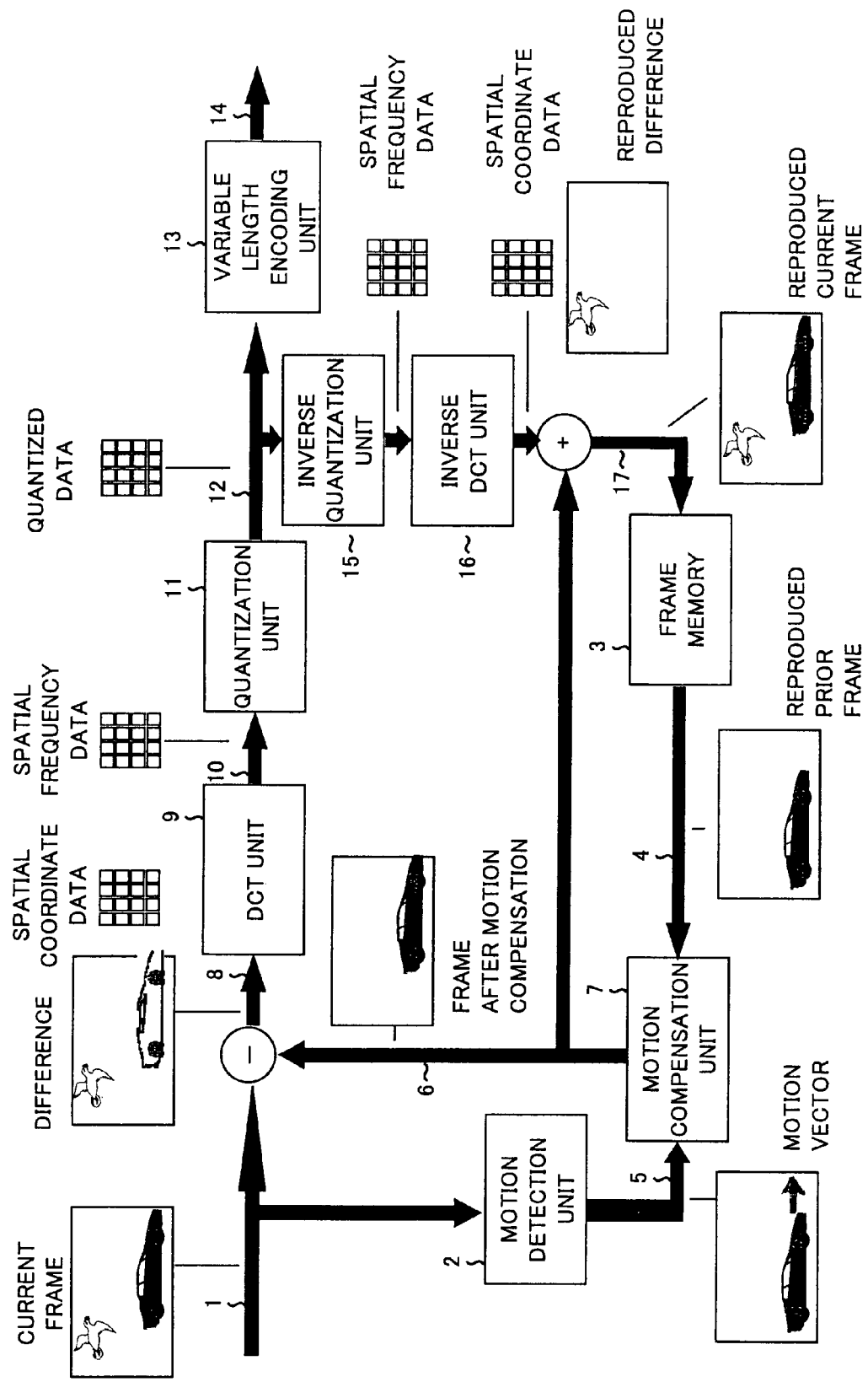
FIG. 1 is a block diagram showing a conventional image encoding apparatus for encoding using DCT technique.
Figure 2:
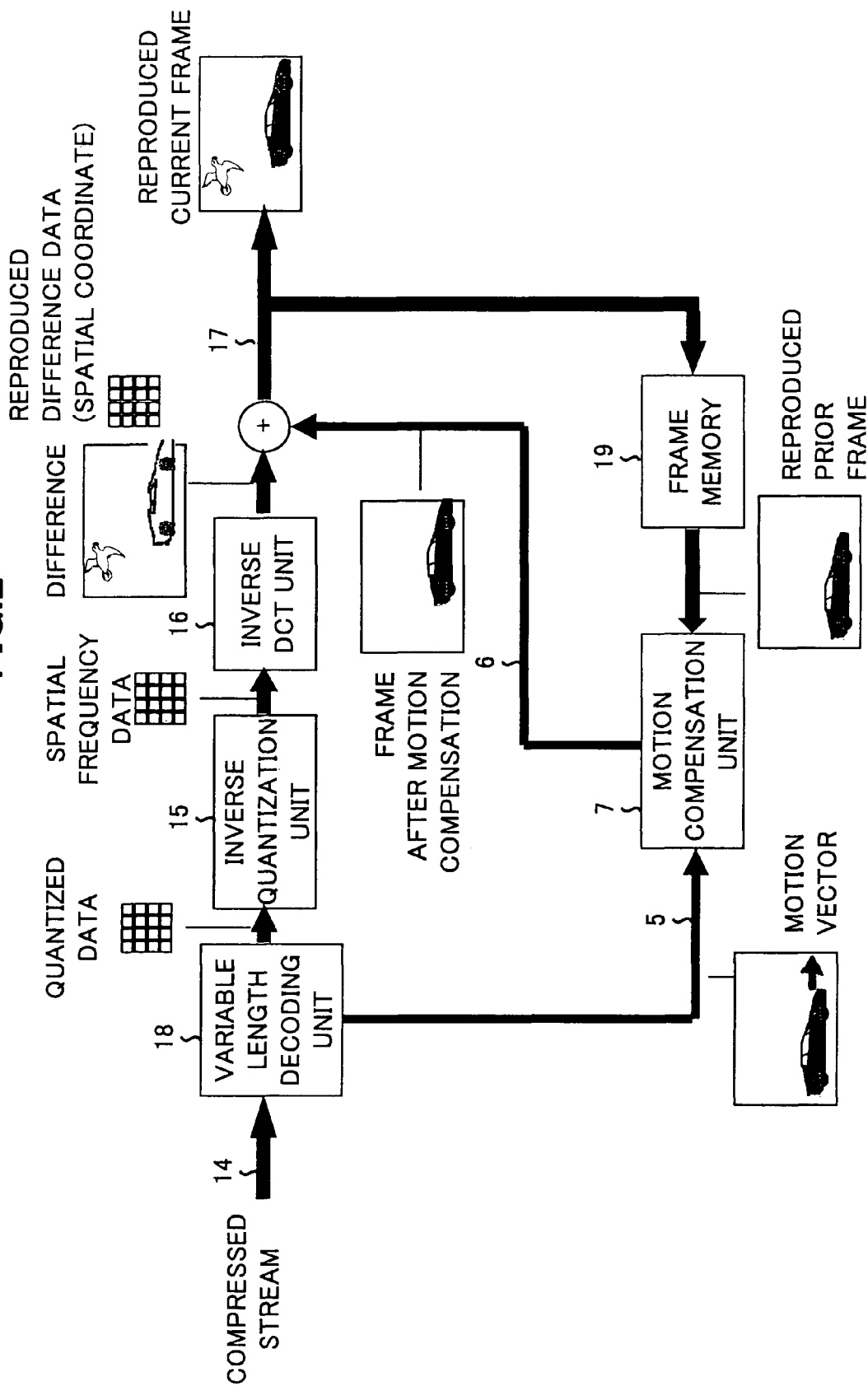
FIG. 2 is a block diagram showing a conventional image decoding apparatus for decoding using DCT technique.
Figure 3:
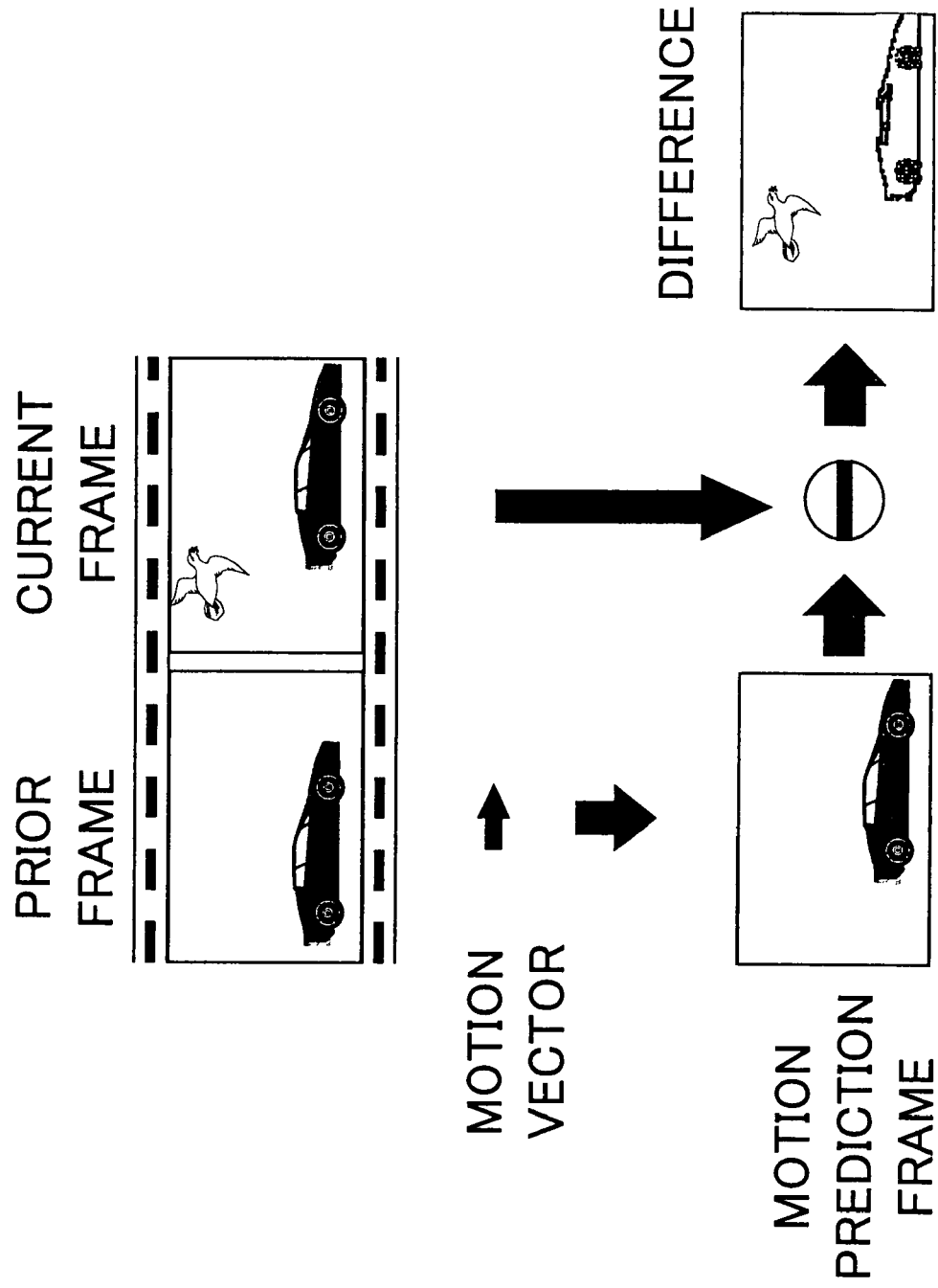
FIG. 3 is a schematic diagram for explaining the mechanism of motion compensation inter-frame prediction.
Figure 4:
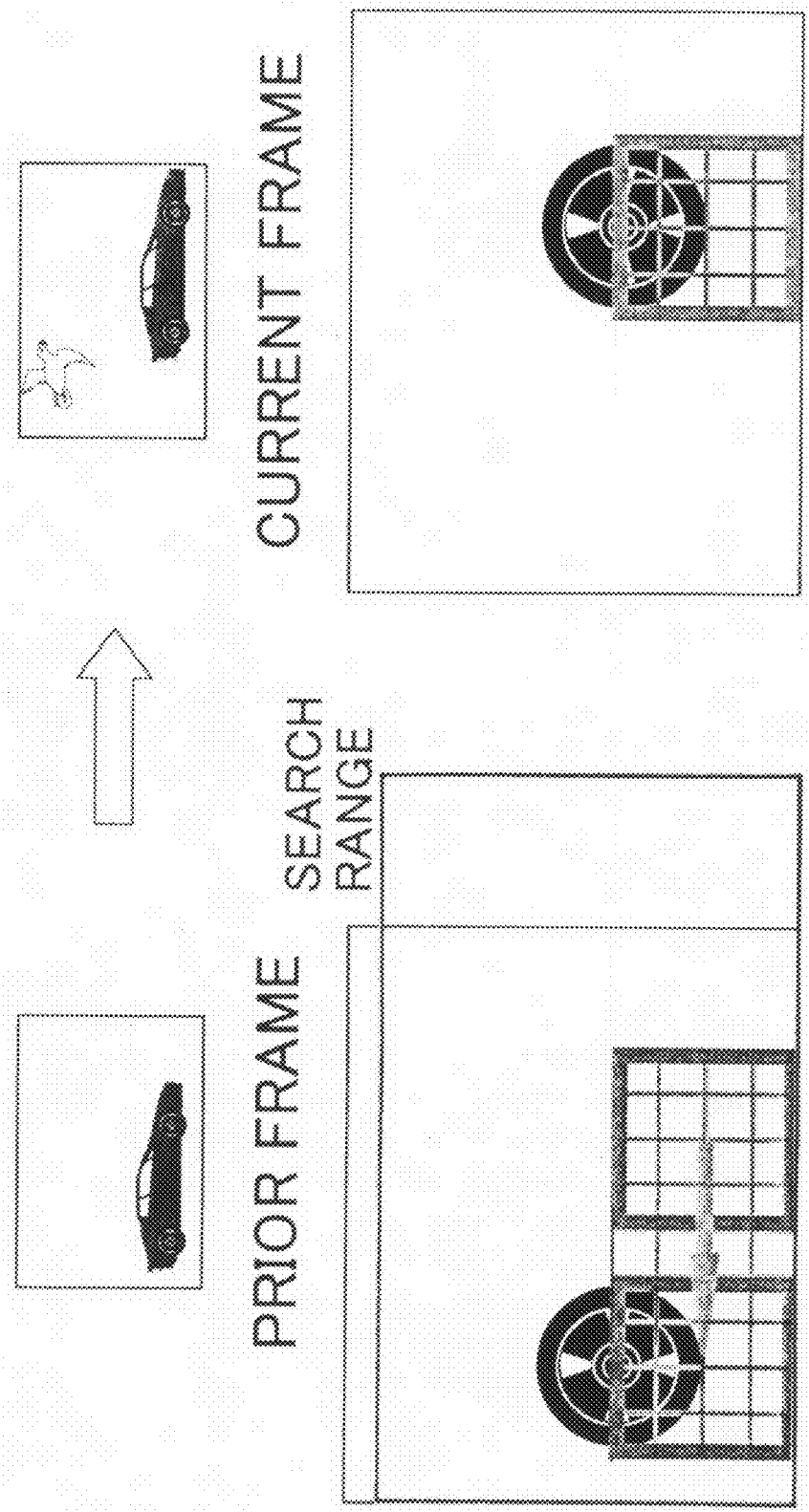
FIG. 4 is a schematic diagram for explaining block matching process that is used to detect a motion vector.
Figure 6A:
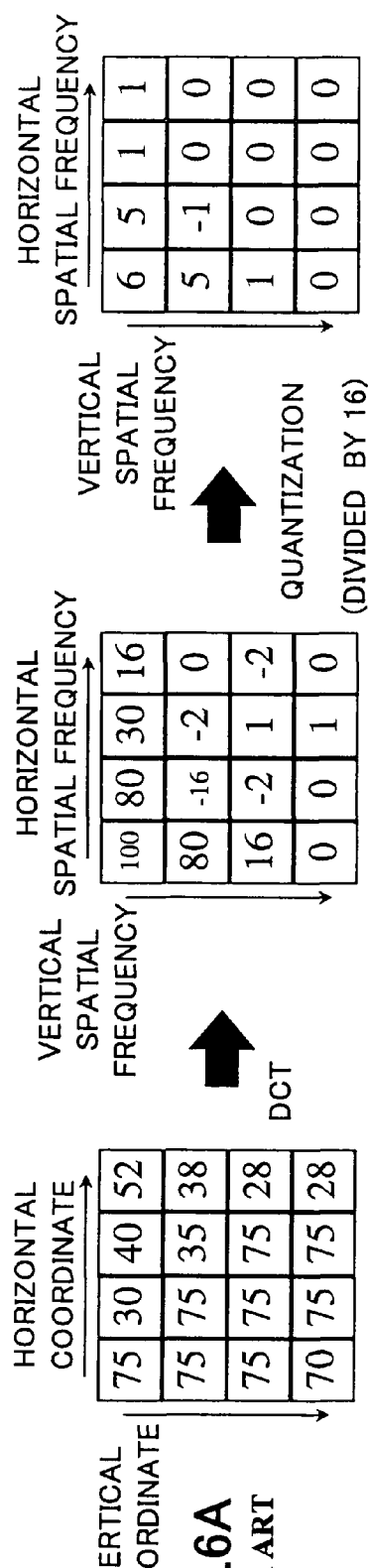
FIGS. 6A and 6B are schematic diagrams for explaining the principle of encoding of the DCT coefficients.
Figure 6B:
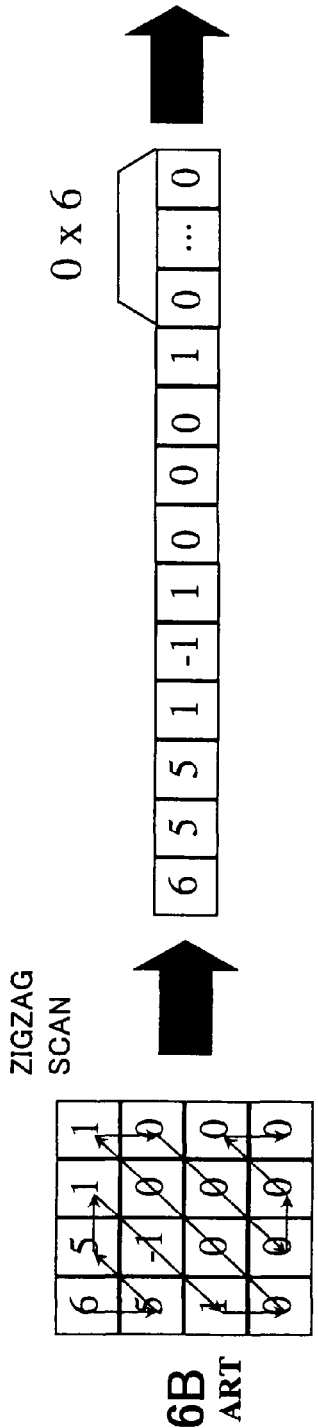

In the image encoding apparatus showed in FIG. 8, the procedure of motion compensation inter-frame prediction is identical to that of the conventional method. FIG. 3 shows the procedure of motion compensation inter-frame prediction, and FIG. 4 shows block matching processing that is used to detect the motion vector. As showed in FIGS. 6A and 6B, the procedure of quantizing coefficients that are obtained by transformation using the modified orthogonal bases and encoding the quantized coefficients into entropy codes is identical to that of the conventional example. The image encoding apparatus and the image decoding apparatus will be described below by reference to these drawings.

In FIG. 8, the input image signal 101 is a signal corresponding to a framed image in a time series of framed images (The framed image to be encoded corresponds to the current frame of FIG. 3). Each macro block of the current frame is encoded by the following procedure. The current macro block is transferred to the motion detection unit 102 that detects motion vector 105. A motion compensation unit 107, using the motion vector 105, extracts a predicted image 106 of each macro block from the partially decoded image 117 stored in the frame memory 103.

A predicted remainder signal 108 is obtained as the difference between the current macro block and the predicted image 106. This predicted remainder signal 108 is converted into the orthogonal transformation coefficient data 110 by the adaptive transformation unit 109. The transformation bases 119 used by the adaptive transformation unit 109 are generated by a transformation base operation unit 118 depending on the pattern of the predicted image 106. The generated transformation bases 119 are transferred to the adaptive transformation unit 109 and used for the orthogonal transformation. The operation of the transformation base operation unit 118 will be described later.

The orthogonal transformation coefficient data 110 obtained by the adaptive transformation unit 109 are quantized by the quantization unit 111, encoded into run-length codes by scanning by the variable length encoding unit 113, and multiplexed in the compressed stream 114 for transmission. The motion vector 105 of each macro block is multiplexed in the compressed stream 114 for transmission. The quantized coefficients 112 are partially decoded by an inverse quantization unit 115 and a inverse adaptive transformation unit 116. The same decoded image 117 as that of the image decoding apparatus is generated by adding the partially decoded image to the predicted image 106. The decoded image 117 is stored in the frame memory 103 as a partially decoded image that is used for the prediction of the next frame.

The transformation base operation unit 118 operates as follows.

Figure 10:
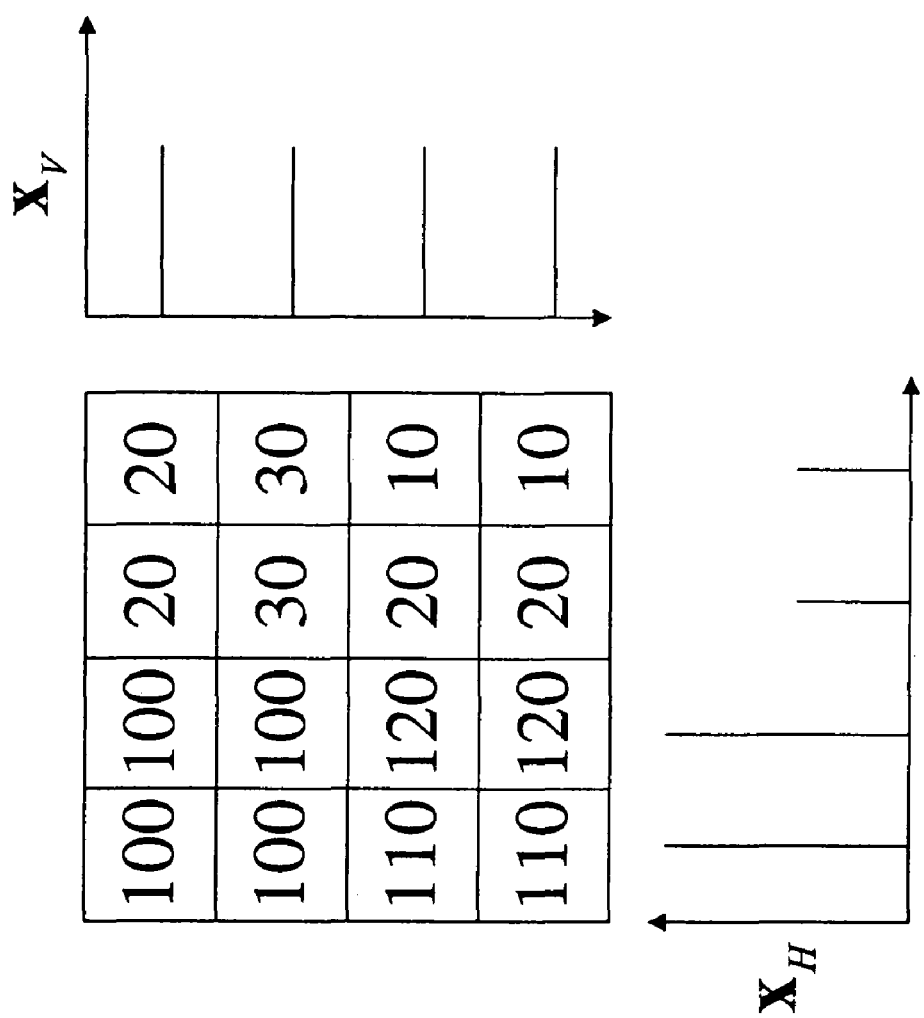
FIG. 10 is a schematic diagram showing the brightness distribution in a region of a predicted image in which orthogonal transformation is applied.

The transformation base operation unit 118 divides the input predicted image 106 into regions (N×N pixel blocks, where N=4, 8, and so forth) to which the orthogonal transformation is applied, obtain the transformation bases 119 for each region, and output the transformation bases 119 to the adaptive transformation unit 109. As showed in FIG. 10, average brightness distributions $x_H$ and $x_V$ in the horizontal and vertical directions are obtained for each region of the predicted image 106 to which the orthogonal transformation is applied. Waveform patterns that reflect the principal components of each region in the horizontal and vertical directions are obtained. FIG. 10 shows an example of image pattern in the case of N=4 in which a steep edge exists in the horizontal directions but the image pattern is flat in the vertical directions. The bases of DCT are modified so that only the transformation coefficients of the principal axis (the first row vector of the transformation matrix, and direct current components in the case of DCT) and its neighbors have a considerable amount, and the average brightness distribution vectors $x_H$ and $x_V$ match the base of the principal axis. Particularly, the horizontal and vertical DCT transformation bases are replaced by weighted normalized average brightness distribution vectors, and correlation matrices $C_H$ and $C_V$ are obtained. Eigenvectors $\phi_{H,0}$-$\phi_{H,N-1}$ and $\phi_{V,0}$-$\phi_{V,N-1}$ of the correlation matrices become the new transformation bases 119. The transformation bases 119 form normalized orthogonal bases.

Accordingly, the patterns of the average brightness distribution of the predicted image 106 in the horizontal directions and the vertical directions are reflected in the principal axis of the orthogonal transformation. In the case where there is a similarity in pattern between the predicted image showed in FIG. 7 and the image to be encoded (the predicted remainder signal), the concentration ratio of the orthogonal transformation coefficients of the image is increased. As an alternative method of implementation, it is possible to prepare some templates of waveform patterns that may appear as an average brightness distribution vector and select a waveform pattern that maximizes the inner product with the average brightness distribution vector.

In addition, the inverse adaptive transformation unit 116 inversely converts the transformation coefficients into a signal in the image space using the transpose of the transformation bases 119.

In the image decoding apparatus showed in FIG. 9, a variable length decoding unit 120 detects a sync word indicating the top of each frame in the received compressed stream 114 and restores the motion vector 105 and the quantized orthogonal transformation coefficients 121 of each macro block. The motion vector 105 is transferred to the motion compensation unit 107. The motion compensation unit 107, in the same manner as it operates in the image encoding apparatus, obtains a partial image stored in the frame memory 122 (used in the same manner as the frame memory 103) that moves for the motion vector 105 as a predicted image 106. The quantized orthogonal transformation coefficients 121 are decoded by the inverse quantization unit 115 and the inverse adaptive transformation unit 116 and added to the predicted image 106 to make the final decoded image 117. The transformation base operation unit 118 calculates and outputs the same transformation bases 119 as the image encoding apparatus. The inverse adaptive transformation unit 116, using the transpose, inversely converts the transformation coefficients into the signal in the image space. The decoded image 117 is output to the display device at a predetermined timing to reproduce the image.

The second embodiment of the present invention will be described below.

Figure 11:
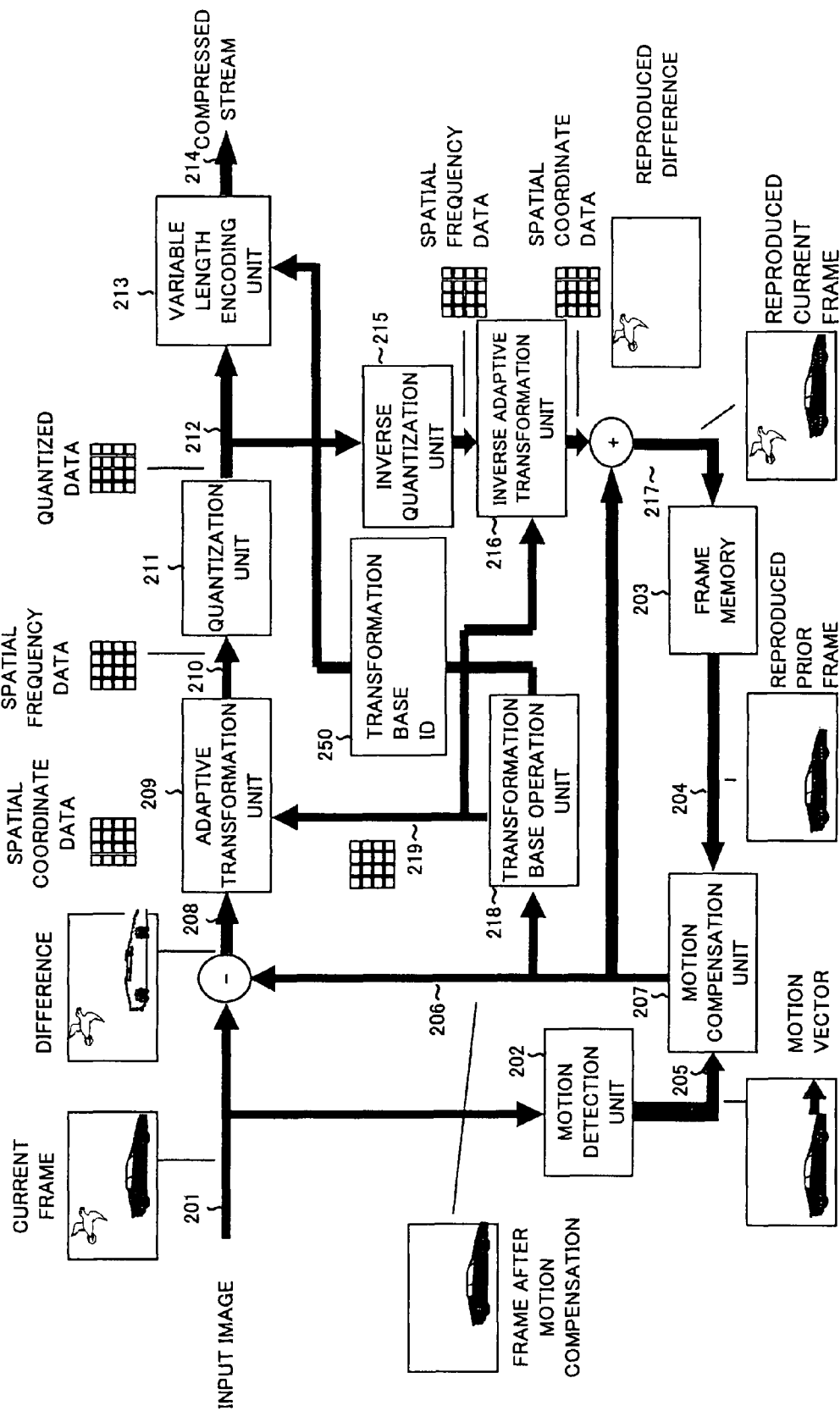
FIG. 11 is a schematic diagram showing an image encoding apparatus according to the second embodiment of the present invention.
Figure 12:
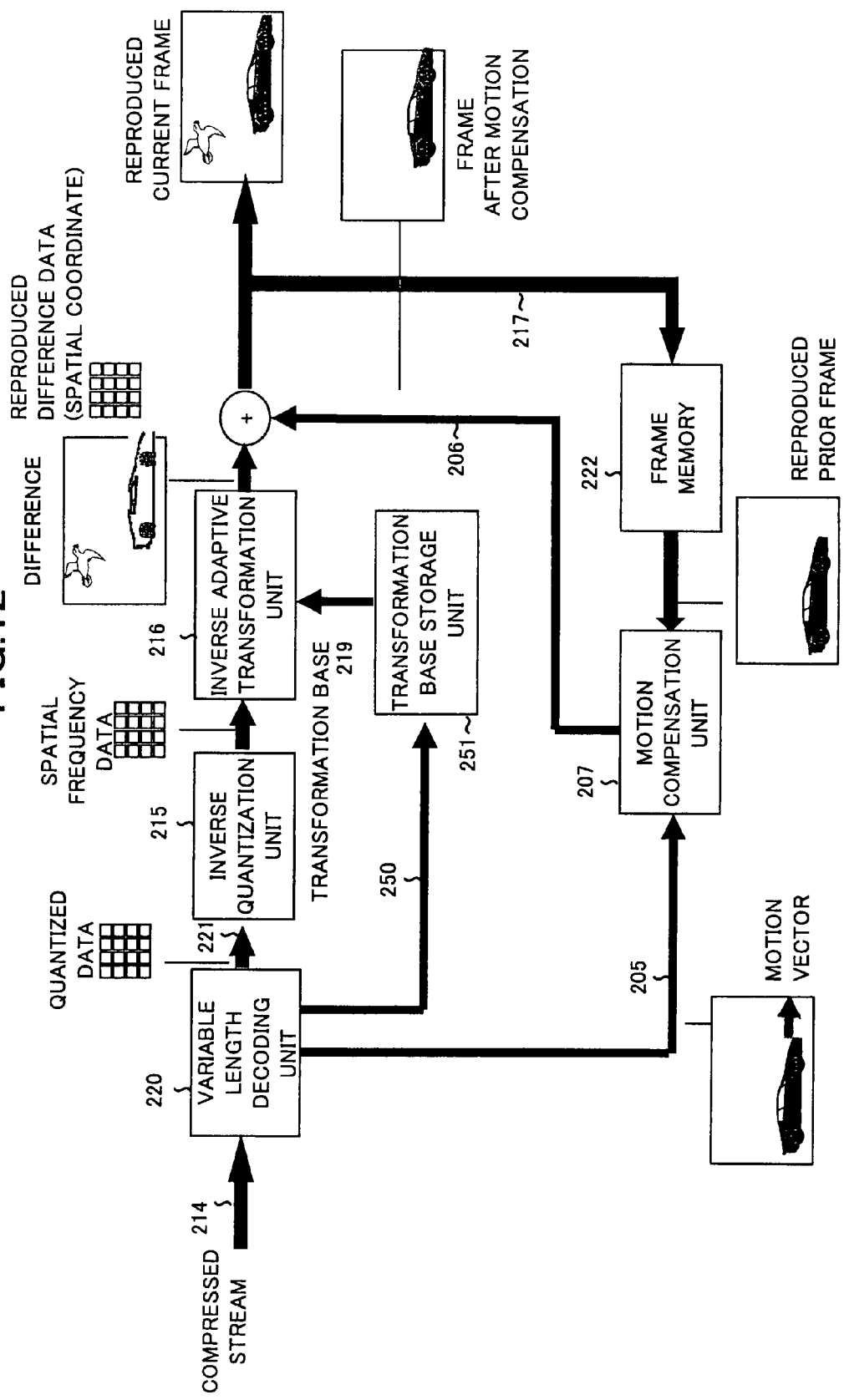
FIG. 12 is a schematic diagram showing an image decoding apparatus according to the second embodiment of the present invention.

The image encoding apparatus according to this embodiment is constructed as showed in FIG. 11, for example, and the image decoding apparatus according to this embodiment is constructed as showed in FIG. 12, for example. This embodiment reduces the redundancy remaining in the time directions by the motion compensation inter-frame prediction, and modifies the DCT bases so that the base corresponding to the principal component can capture the waveform pattern of the predicted image of a macro block obtained by the motion compensation prediction to compress the information by encoding using the modified bases. Several sets of transformation bases that fit local characteristics of corresponding image are prepared, and a set of transformation bases that fits the pattern of the predicted image is selected. Since the same set of transformation bases is provided to both the image encoding apparatus and the image decoding apparatus, it is not necessary to transmit information other than ID information indicating the switching of bases. The image decoding apparatus is required only to selects a set of bases based on the ID information and does not need to calculate bases.

The image encoding apparatus showed in FIG. 11 employs the same procedure of the motion compensation inter-frame prediction as described in connection with the conventional example. The procedure is illustrated in FIG. 3, and block matching processing to detect the motion vector is illustrated in FIG. 4. The procedure (FIGS. 6A and 6B) to quantize the coefficients obtained by the orthogonal transformation and to encode the coefficients into entropy codes are identical to the conventional example. The operation of the image encoding apparatus and the image decoding apparatus is described by reference to these drawings.

In FIG. 11, an input image signal 201 is a signal of a framed image in a time series of framed images (the framed image to be encoded corresponds to the current frame of FIG. 3). The current frame is encoded in the following procedure by a macro block. The current macro block is transferred to the motion detection unit 202 for detecting the motion vector 205. The motion compensation unit 207 retrieves a predicted image 206 of each macro block by looking up partially decoded images 217 in the frame memory 203 using the motion vector 205.

The predicted remainder signal 208 is obtained as the difference between the current macro block and the predicted image 206 and converted into the orthogonal transformation coefficient data 210 by the adaptive transformation unit 209. The transformation bases 219 used by the adaptive transformation unit 209 is selected by the transformation base operation unit 218 depending on the used pattern of the predicted image 206. The selected transformation bases 219 are transferred to the adaptive transformation unit 209 and used for the orthogonal transformation. The ID information 250 of a transformation base 219 for each orthogonal transformation processing is multiplexed on the compressed stream 214 and transferred to the image decoding apparatus. The operation of the transformation base operation unit 218 will be described later.

The orthogonal transformation coefficient data 210 obtained by the adaptive transformation unit 209 are quantized by the quantization unit 211, encoded into run-length codes by the variable length encoding unit 213, and multiplexed on the compressed stream 214 for transmission. A motion vector 205 of each macro block is multiplexed on the compressed stream 214 and transmitted. The quantized coefficients 212 are partially decoded by the inverse quantization unit 215 and the inverse adaptive transformation unit 216. The result is added to the predicted image 206 to make the same decoded image 217 as the image decoding apparatus. The decoded image 217 is stored in the frame memory 203 as a partially decoded image to be used for the prediction of the next frame.

The transformation base operation unit 218 performs the following operation.

The transformation base operation unit 218 divides the input predicted image 206 into regions (N×N pixel blocks, where N=4, 8, and so forth) to which the orthogonal transformation is applied, obtain the transformation bases 219 for each region, and output the transformation bases 219 to the adaptive transformation unit 109. As shown in FIG. 10, average brightness distributions $x_H$ and $x_V$ in the horizontal and vertical directions are obtained for each region of the predicted image 206 to which the orthogonal transformation is applied. Waveform patterns that reflect the principal components of each region in the horizontal and vertical directions are obtained (see FIG. 10). "K" kinds of normalized orthogonal bases $A_i$ (i=0, 1, . . . , K-1), the principal axis of which reflects the pattern of typical average brightness distribution vector $x_H$ and $x_V$ are prepared for the transform base operation unit 218, and one of the bases $A_i$ corresponding to $x_H$ and $x_V$ is selected. Examples of the bases (N=4) prepared as $A_i$ are showed in FIGS. 13B through 19B.

In addition, inverse transformation matrices corresponding to the transpose of the transformation bases used by the inverse adaptive transformation unit 216 of the image decoding apparatus to be described later are showed in FIGS. 13B through 19B as well as the normalized orthogonal bases (forward transformation matrix).

In the case of basic DCT base showed in FIGS. 13B and 13C, the principal axis base is a direct current component. Using the forward transformation matrix that becomes this DCT base and the inverse transformation matrix, the DCT transformation and its inverse transformation represented by the following formulae showed in FIG. 13A are performed.

Forward transformation $F(u) = \sqrt{\frac{2}{N}} C(u) \sum_{x=0}^{N-1} f(x) \cos \frac{\pi(2x+1)u}{2N}$ (Formula 1)

Inverse transformation $f(x) \sqrt{\frac{2}{N}} C(u) F(u) \cos \frac{\pi(2x+1)u}{2N}$ $C(u) = \frac{1}{\sqrt{2}}$ ($u = 0$)

$1$ ($u \neq 0$)

In the case of the above DCT base, the brightness of patterns showed in FIGS. 14A and 14B and patterns showed in FIGS. 15A and 15B changes smoothly. Patterns showed in FIGS. 16A and 16B and patterns showed in FIGS. 17A and 17B have ups and downs of pixel values shaped like mountains and valleys in an N×N pixel block. Further, in the case of patterns showed in FIGS. 18A and 18B and patterns showed in FIGS. 19A and 19B, the principal axis reflects a pattern having a steep edge. As a norm useful in selecting bases, the transformation base operation unit 218 selects the transformation base $A_i$ that maximizes the inner product between the average brightness distribution vectors $x_H$, $x_V$ and the principal axis base vector, for example.

In the case where there is similarity in pattern between the predicted image and the image to be encoded (the predicted remainder signal), the concentration ratio of the orthogonal transformation coefficients of the image to be encoded is increased by selectively using a base in which the power concentration ratio of the pattern of the predicted image is high by the above procedure. Further, since the frequency in which ID information 250 is selected is biased due to the characteristics of an image, it is possible to reduce the bit amount of the ID information to be transmitted by assigning an appropriate Huffman code by the variable length encoding unit 213 and using entropy encoding such as arithmetic code.

The image decoding apparatus showed in FIG. 12 operates as follows.

In this image decoding apparatus, a variable length decoding unit 220 detects a sync word indicating the top of each frame in the received compressed stream 214 and restores the transformation base ID information 250, the motion vector 205, the quantized orthogonal transformation coefficient 221 for each orthogonal transformation and for each macro block. The motion vector 205 is transferred to the motion compensation unit 207. The motion compensation unit 207, in the same manner as it operates in the image encoding apparatus, obtains a partial image stored in the frame memory 222 (used in the same manner as the frame memory 203) that moves for the motion vector 205 as a predicted image 206. The quantized orthogonal transformation coefficients 221 are decoded by the inverse quantization unit 215 and the inverse adaptive transformation unit 216 and added to the predicted image 206 to make the final decoded image 217.

In the transformation base storage unit 251, there are the same base set $A_i$ (see FIGS. 13 through 19) as the image encoding apparatus. A transformation base 219 is selected based on transformation base ID information 250, and the selected transformation base 219 is transferred to the inverse adaptive transformation unit 216. The inverse adaptive transformation unit 216 inversely transforms the transformation coefficient into a signal in an image space using the transpose of the selected transform base $A_i$. The decoded image 217 is output to the display device at a predetermined timing.

As a variation of the above second embodiment, it is possible to transmit only flag information indication which base to be used, that is, whether to use the DCT base being the reference transformation base, or which one of the transformation bases $A_i$ to be used, instead of the ID information 250, as is, identifying which transformation base $A_i$ (i=0, 1, ..., K−1). In this case, the image encoding apparatus is constructed as showed in FIG. 20, for example, and the image decoding apparatus is constructed as showed in FIG. 21, for example.

Figure 20:
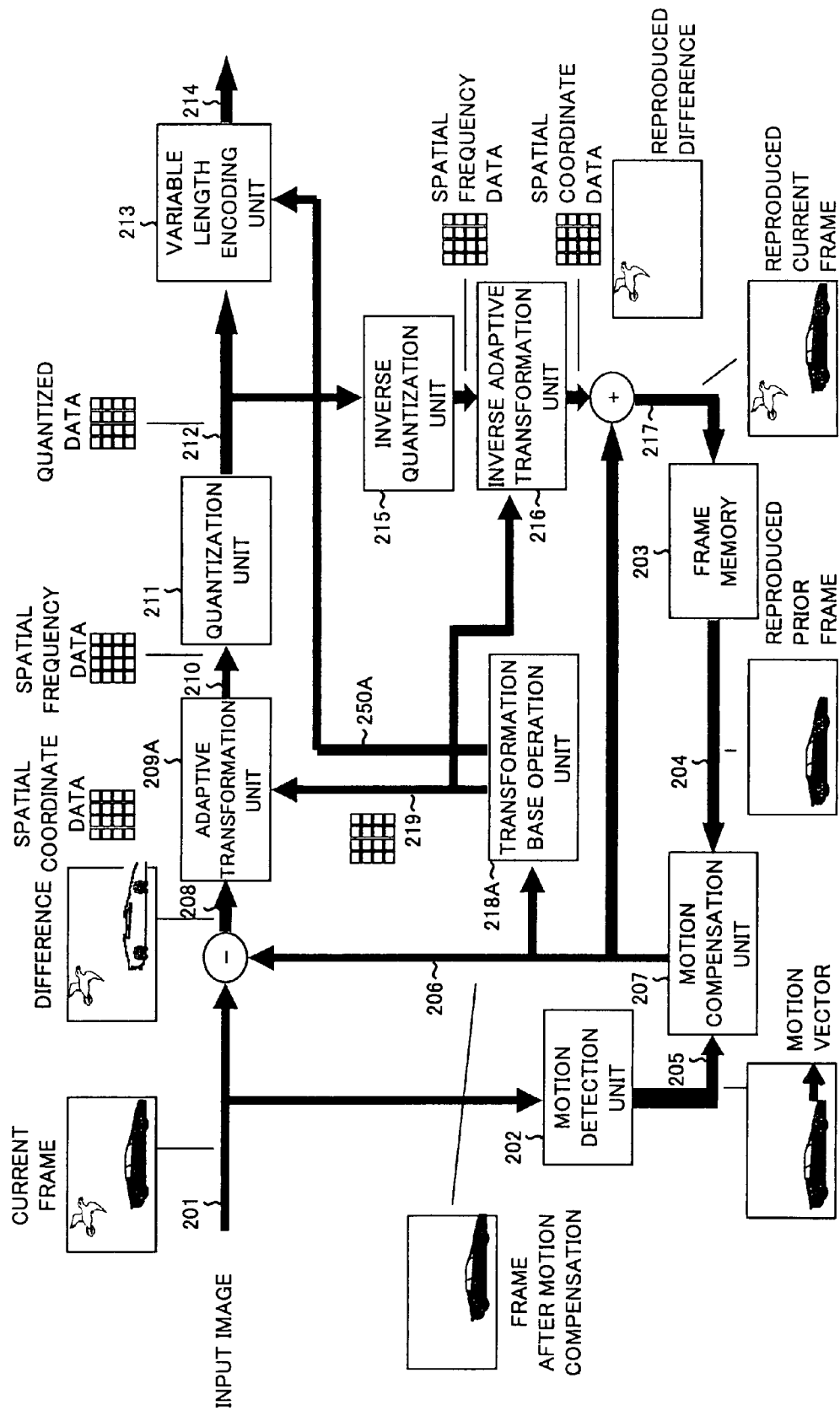
FIG. 20 is a schematic diagram showing a variation of the image encoding apparatus according to the second embodiment of the present invention.

The base operation unit 218A of the image encoding apparatus showed in FIG. 20 is provided with "K" kinds of normalized orthogonal base $A_i$ (i=0, 1, ..., K−1) that reflects typical image patterns as showed in FIGS. 13 through 19. This base operation unit 218A divides the input predicted image 206 into regions (N×N pixel blocks, where N=4, 8, and so forth) to which the orthogonal transformation is applied, and selects the most appropriate adaptive transformation base from the transformation base $A_i$ for each region to which the orthogonal transformation is applied. As a method to select base $A_i$, it is possible, for example, to obtain the average brightness distribution vectors $x_H$ and $x_V$ in the horizontal directions and the vertical directions, respectively, of each region of the predicted image to which the orthogonal transformation is applied and to select $A_i$ that maximizes the inner product between the average brightness distribution vectors and the principal axis base vector.

The DCT base or the above adaptive transformation base adaptively obtained for the predicted image 206, whichever gives a higher efficiency of encoding, is selected and output as the transformation base 219. When comparing the efficiency of encoding, one can select whichever minimizes a rate distortion cost defined as a linear sum of encoding distortion and the amount of codes, for example. The transformation base operation unit 218A transmits flag information 250A indicating which the DCT base or the base determined by the transformation base operation unit 218A to the image decoding apparatus by multiplexing the flag information 250A to the compressed stream.

The transformation base 219 thus obtained is transmitted to the adaptive transformation unit 209A and used for transformation.

Figure 21:
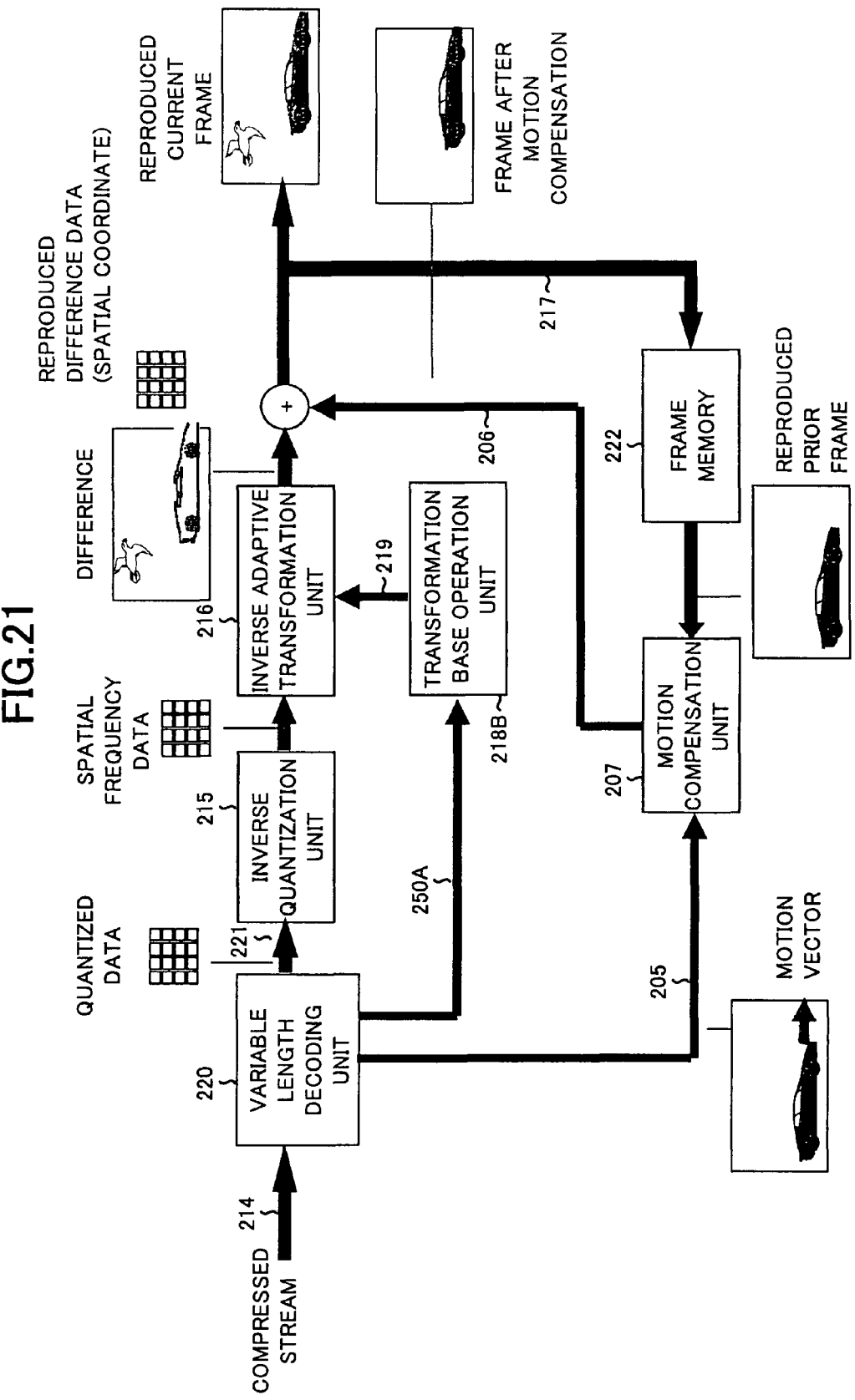
FIG. 21 is a schematic diagram showing a variation of the image decoding apparatus according to the second embodiment of the present invention.

In the image decoding apparatus showed in FIG. 21, the above flag information 250A is extracted from the compressed stream and input to the transformation base operation unit 218B. If the transformation base operation unit 218B determines that a base other than DCT is used, the transformation base operation unit 218B identifies a transformation base $A_i$ using the completely same standard as used by the image encoding apparatus and outputs it as the transformation base 219. If the transformation base operation unit 218B determines that the DCT base is used, the transformation base operation unit 218B outputs the DCT base as the transformation base 219.

The image decoding apparatus can use the completely same predicted image 206 as used by the image encoding apparatus. It is possible to use the same standard of judgment as described in connection with the above image encoding apparatus. That is, one can obtain the average brightness distribution vectors $x_H$ and $x_V$ in the horizontal and vertical directions of each region of the predicted image 206 to which the orthogonal transformation is applied and select a transformation base $A_i$ that maximizes the inner product between the average brightness distribution vectors and the principal axis base vector. The transformation base 219 thus obtained is used by the inverse adaptive transformation unit 216 to reproduce the signal in the image space by inversely transforming the transformation coefficient.

Because an image signal is generally not steady, the more various the base set $A_i$ is, the higher the efficiency of the adaptive orthogonal transformation becomes. According to the image encoding apparatus and the image decoding apparatus described above, even if a great variety of transformation bases $A_i$ that fit image patterns, it is not necessary to increase additional information to identify one of the transformation bases $A_i$, which results in efficient encoding.

Further, as another variation of the second embodiment, it is possible to have the receiving side automatically determine which the DCT base being the reference of transformation bases or the transformation base $A_i$ based on the activity (for example, the divergence of brightness and the absolute difference between the maximum and minimum of brightness) of a region of the reference image instead of transmitting the flag information indicating which the DCT base or the transformation base $A_i$. If the activity is high, the transformation base ID information is transmitted by the encoding side, and if the activity is low, the receiving side uses the DCT base instead of transmitting the transformation base ID information. If the activity of the reference image region is higher than a predetermined value, the receiving side determines that a transformation bases is designated, and decodes the received transformation base ID information.

The third embodiment of the present invention will be described below.

Figure 22:
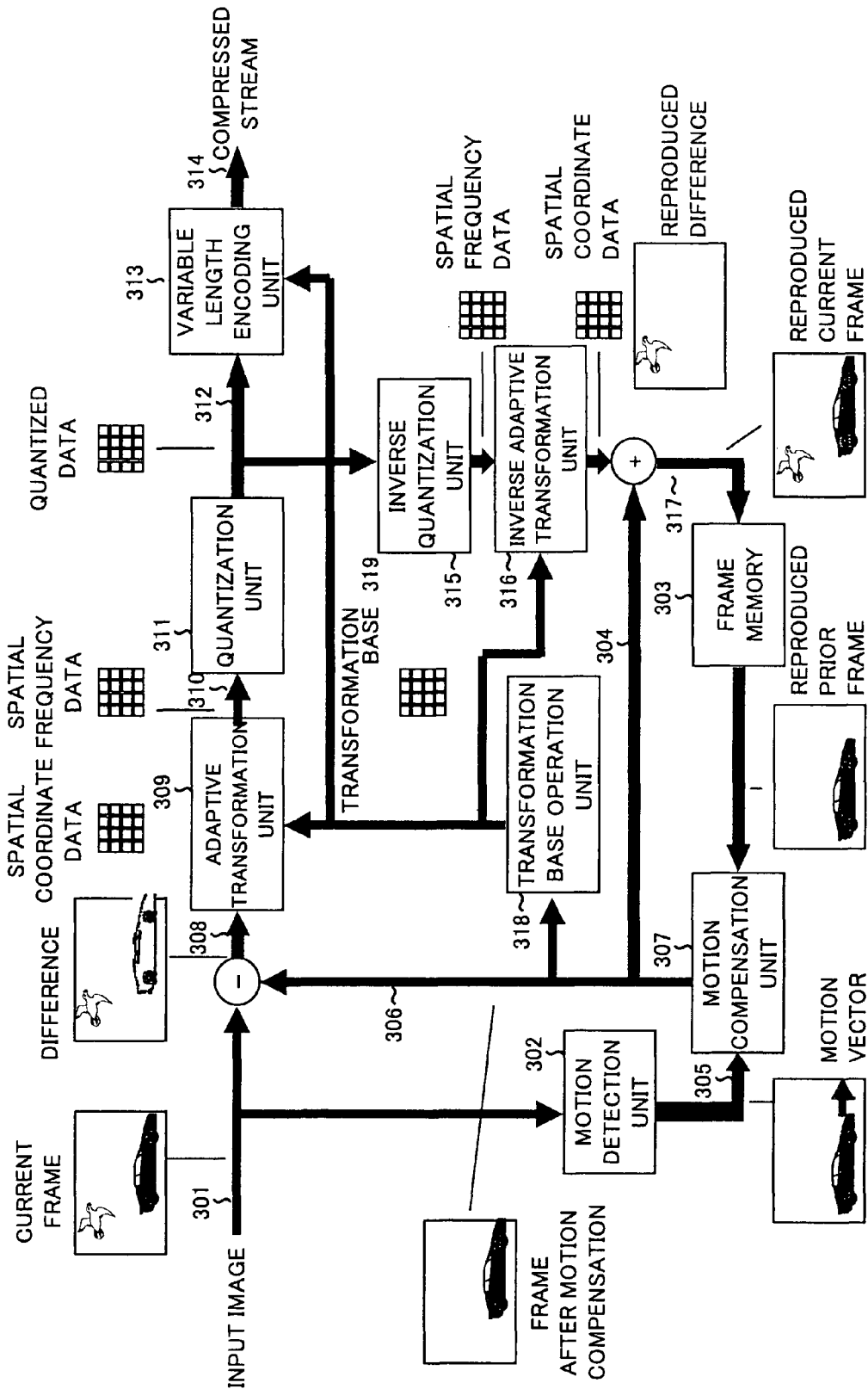
FIG. 22 is a schematic diagram showing an image encoding apparatus according to the third embodiment of the present invention.
Figure 23:
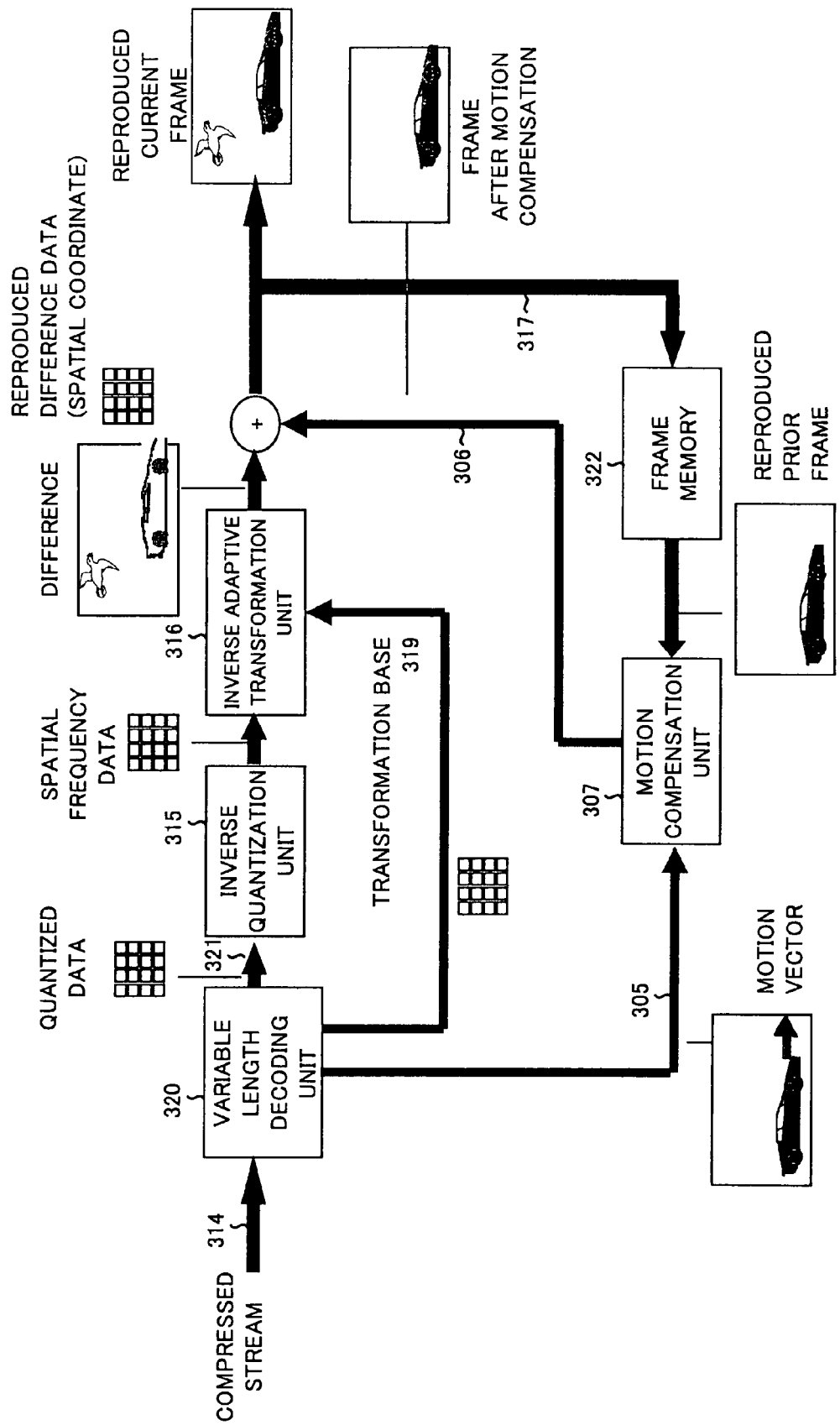
FIG. 23 is a schematic diagram showing an image decoding apparatus according to the third embodiment of the present invention.

The image encoding apparatus according to this embodiment is constructed as showed in FIG. 22, for example, and the image decoding apparatus according to this embodiment is constructed as showed in FIG. 23, for example. In this embodiment, the image encoding apparatus transmits the transformation base obtained thereby as encoded data to the image decoding apparatus so that the image decoding apparatus does not need to calculate the base.

In the image encoding apparatus showed in FIG. 22, an input image signal 301 is a signal of frame image in a time series of frame images (The frame image to be encoded corresponds to the current frame of FIG. 3). The current frame is encoded by a macro block in the following procedure. The current macro block is transferred to the motion detection unit 302, and the motion detection unit 302 detects the motion vector 305. The motion compensation unit 307 retrieves a predicted image 306 of each macro block by reference to the partially decoded image 317 stored in the frame memory 303 using the motion vector 305.

The predicted remainder signal 308 is obtained as the difference between the current macro block and the predicted image 306, and transformed into the orthogonal transformation coefficient data 310 by the adaptive transformation unit 309. The transformation base 319 that the adaptive transformation unit 309 uses is generated by the transformation base operation unit 318 depending on the pattern of the used predicted image 306. Since the same transformation base is used at the decoding side, each transformation base vector of the transformation base 319 is encoded and multiplexed on the compressed stream 314. The transformation base 319 is also transferred to the adaptive transformation unit 309 and used for the orthogonal transformation. The operation of the transformation base operation unit 318 is exactly identical to that of the transformation base operation unit 118 according to the first embodiment described above.

The orthogonal transformation coefficient data 310 obtained by the adaptive transformation unit 309 are quantized by the quantization unit 311, scanned and encoded into run-length codes by the variable length encoding unit 313, and multiplexed on the compressed stream 314 for transmission. The motion vector 305 is multiplexed on the compressed stream 314 by a macro block and transmitted. The quantized coefficient 312 is partially decoded by the inverse quantization unit 315 and the inverse adaptive transformation unit 316. The result is added to the predicted image 306 to generate the same decoded image 317 as the image decoding apparatus. Because the decoded image 317 is used for the prediction of the next frame, the decoded image 317 is stored in the frame memory 303 as a partially decoded image.

In the image decoding apparatus showed in FIG. 23, in response to reception of the compressed stream 314, the variable length decoding unit 320 detects a sync word indicating the top of each frame and reproduces the transformation base 319 used for each orthogonal transformation, the motion vector 305, the quantized orthogonal transformation coefficient 321. The motion vector 305 is transferred to the motion compensation unit 307. The motion compensation unit 307, in the same manner in which the motion compensation unit of the image encoding apparatus operates, retrieves a portion of image that has moved for the motion vector 305 as the predicted image 306 from the frame memory 322 (used in the same manner in which the frame memory 303 is used). The quantized orthogonal transformation coefficient 321 is decoded through the inverse quantization unit 315 and the inverse adaptive transformation unit 316, and becomes the final decoded image 317 by being added to the predicted image 306. The inverse adaptive transformation unit 316 inversely transforms the transformation coefficient using the transpose of the transformation base 319 to reproduce a signal in an image space. The decoded image 317 is output to the display device at a predetermined timing to reproduce the image.

Additionally, the fourth embodiment of the present invention will be described below.

Figure 24:
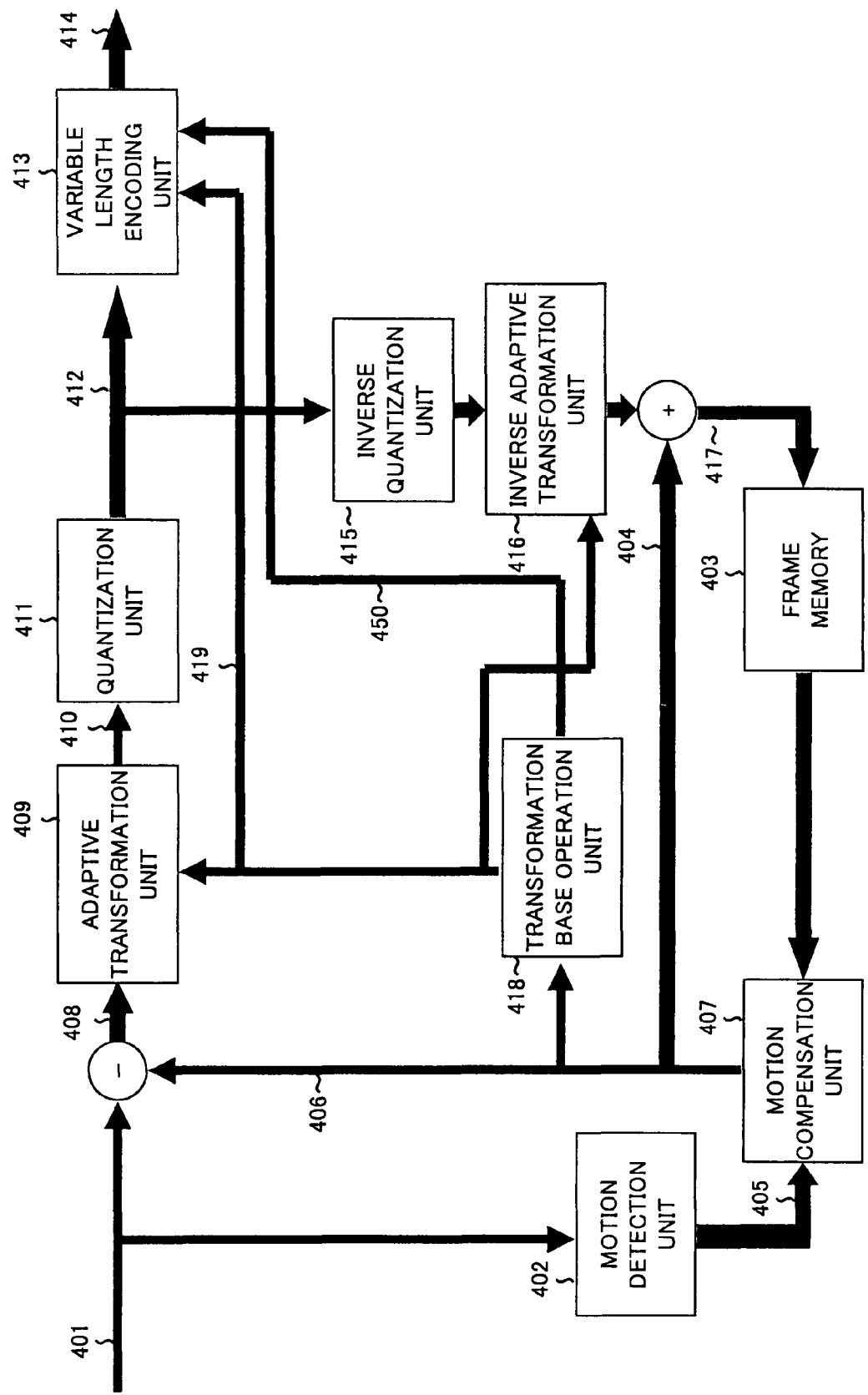
FIG. 24 is a schematic diagram showing an image encoding apparatus according to the fourth embodiment of the present invention.
Figure 25:
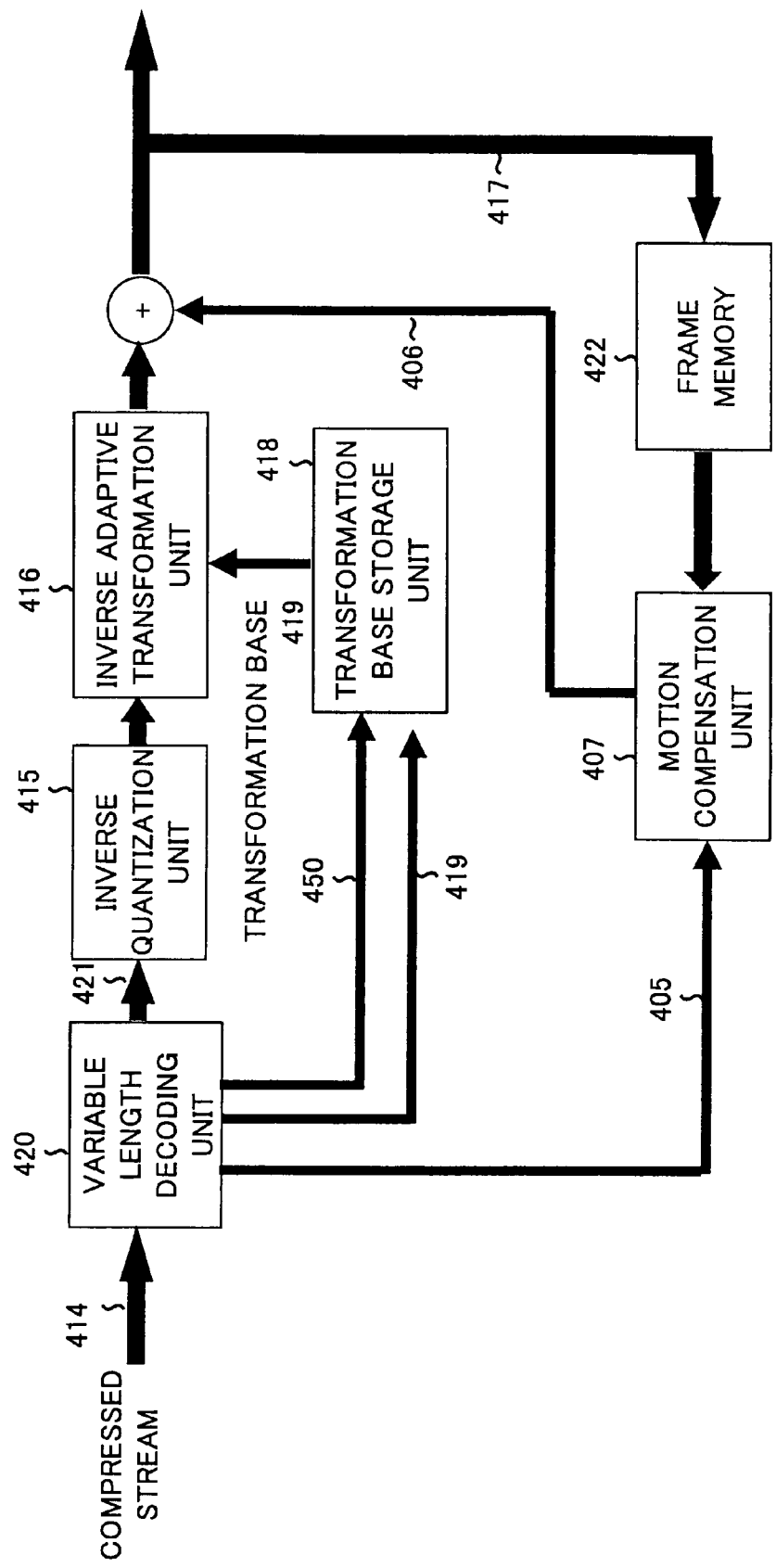
FIG. 25 is a schematic diagram showing an image decoding apparatus according to the fourth embodiment of the present invention.

The image encoding apparatus according to this embodiment is constructed as showed in FIG. 24, for example, and the image decoding apparatus according to this embodiment is constructed as showed in FIG. 25, for example.

This embodiment encodes an image using a base set $A_i$ (i=0, 1, ..., K−1) by adaptively selecting a transformation base in the same manner in which the second embodiment described above operates, and additionally updates the transformation base $A_i$ dynamically. Accordingly, when the image encoding apparatus encounters an image pattern with which the image encoding apparatus cannot fully comply using the fixed transformation set, the image encoding apparatus can further improve the efficiency of encoding.

In the image encoding apparatus showed in FIG. 24, the input image signal 401 represents a signal of each frame image in a time series of frame images (the frame image to be encoded corresponds to the current frame of FIG. 3). The current frame is encoded by a macro block in the following procedure. The current macro block is transferred to the motion detection unit 402, and the motion detection unit 402 detects the motion vector 405. The motion compensation unit 407 retrieves the predicted image 406 of each macro block from the frame memory 403 by reference to partially decoded image 417 using the motion vector 405.

The predicted remainder signal 408 is obtained as the difference between the current macro block and the predicted image 406, and converted into the orthogonal transformation coefficient data 410 by the adaptive transformation unit 409. The transformation base 419 that is used by the adaptive transformation unit 409 is adaptively selected by the transformation base operation unit 418 depending on the pattern of the predicted image 406. The selected transformation base 419 is transferred to the adaptive transformation unit 409 and used for the orthogonal transformation. In addition, the ID information 450 of the transformation base 419 by an orthogonal transformation operation is multiplexed on the compressed stream 414 and transmitted to the image decoding apparatus.

Further, when the transformation base operation unit 418 generates another transformation base that is no included in the base set $A_i$ at the point of time, the transformation base is multiplexed on the compressed stream 414 through the variable length encoding unit 413 and transmitted with the ID information 450. In this case, the ID information 450 that is transmitted means the ID information of a base that is replaced by the transformation base that is transmitted at the same time. The operation of the transformation base operation unit 418 will be described later.

The orthogonal transformation coefficient data 410 obtained by the adaptive transformation unit 409 is quantized by the quantization unit 411, scanned and encoded into run-length codes by the variable length encoding unit 413, and multiplexed on the compressed stream for transmission. The motion vector 405 is also multiplexed on the compressed stream 414 by a macro block and transmitted. The quantized coefficient 412 is partially decoded by the inverse quantization unit 415 and the inverse adaptive transformation unit 416. The same decoded image 417 as that of the image decoding apparatus is generated by adding the partially decoded image and the predicted image 406. Since the decoded image 417 is used for the prediction of the next frame, the decoded image 417 is stored in the frame memory 403 as the partially decoded image.

The transformation base operation unit 418 operates as follows.

The transformation base operation unit 418 divides the input predicted image 406 into regions (N×N pixel blocks, where N=4, 8, and so forth) to which the orthogonal transformation is applied, obtains a transformation base 419 by a region, and outputs the obtained transformation base to the adaptive transformation unit 409. The transformation base operation unit 418 first obtains average brightness distribution $x_H$ and $x_V$ in the horizontal and vertical directions for each region of the predicted image 406 to which the orthogonal transformation is applied. A waveform pattern that reflects the principal components of the horizontal and vertical directions of each region is obtained (see FIG. 10). "K" kinds of normalized orthogonal bases $A_i$ (i=0, 1, ..., K−1) of which principal axis reflects the pattern of the typical average brightness distribution vectors $x_H$ and $x_V$ are prepared in the transformation base operation unit 418, and one of the bases $A_i$ corresponding to $x_H$ and $x_V$ is selected. An example of base $A_i$ (N=4) is showed in FIGS. 13 through 19. Since each example is described in detail in connection with the second embodiment, their description is omitted here.

As described in connection with the first embodiment, the transformation base operation unit 418 calculates a base (named A') using $x_H$ and $x_V$. The transformation base operation unit 418 selects a base that maximizes the inner product between the average brightness distribution vector $x_H$, $x_V$ and the principal base vector from $A_i$ (i=0, 1, ..., K−1) and A'. When A' is selected, a base of which inner product (similarity information) is the smallest is replaced with A'. In the case where A' is selected, the amount of transmitted codes increases since the base A' needs to be transmitted. In consideration of the increase of the amount of transmitted codes, it is possible to select the best one of the bases $A_i$ and compare it with A' by encoding the image using both bases to select one that shows better balance of rate and distortion. It is also possible to give the inner product (similarity information) an offset so that one of bases $A_i$ is likely to be selected.

In the case where there is similarity in pattern between the predicted image and the image to be encoded (predicted remainder signal), it is possible to improve the concentration ratio of the orthogonal transformation coefficient of the image to be encoded by selectively using a base that increases the power concentration ratio of the pattern of the predicted image. Since the frequency at which each item of the ID information 450 becomes biased depending on the characteristics of the image, it is possible to reduce the bit amount of ID information that is transmitted by appropriately assigning Huffman code or using entropy codes such as an arithmetic code. Additionally, since the base that is replaced by A' is uniquely determined based on the ID information 450, it is possible to reduce the amount of base information to be transmitted by transmitting only a base vector of A' different from that of the base to be replaced with A'.

The image decoding apparatus showed in FIG. 25 operates as follows.

In this image decoding apparatus, in response to reception of the compressed stream 414, the variable length decoding unit 420 detects a sync word indicating the top of each frame and then, decodes the transformation base ID information 450 used for each orthogonal transformation, the transformation base 419 required in the case where a base is replaced, the motion vector 405, and the quantized orthogonal transformation coefficient 421. The motion vector 405 is transferred to the motion compensation unit 407, and the motion compensation unit 407 retrieves a portion of image that is moved for the motion vector 405 from the frame memory 422 (used in the same manner in which the frame memory 403 is used) as the predicted image 406. The quantized orthogonal transformation coefficient 421 is decoded by the inverse quantization unit 415 and the inverse adaptive transformation unit 416, and then, added to the predicted image 406 to make the final decoded image 417.

A base 419 corresponding to the transformation base ID information 450 is selected from the same base set $A_i$ stored in the transformation base storage unit 418, and transferred to the inverse adaptive transformation unit 416. In the case where the transformation base 419 has been transmitted as encoding data, however, a base in the base sets $A_i$ corresponding to the ID information 450 is replaced with the transformation base 419, and the transformation base 419 is transferred, as is, to the inverse adaptive transformation unit 416. The inverse adaptive transformation unit 416 inversely transforms the transformation coefficient using the transpose of the selected base and reproduces a signal in the image space. The decoded image 417 is output to the display device at a predetermined timing to reproduce the image.

The fifth embodiment of the present invention will be described below.

Figure 26:
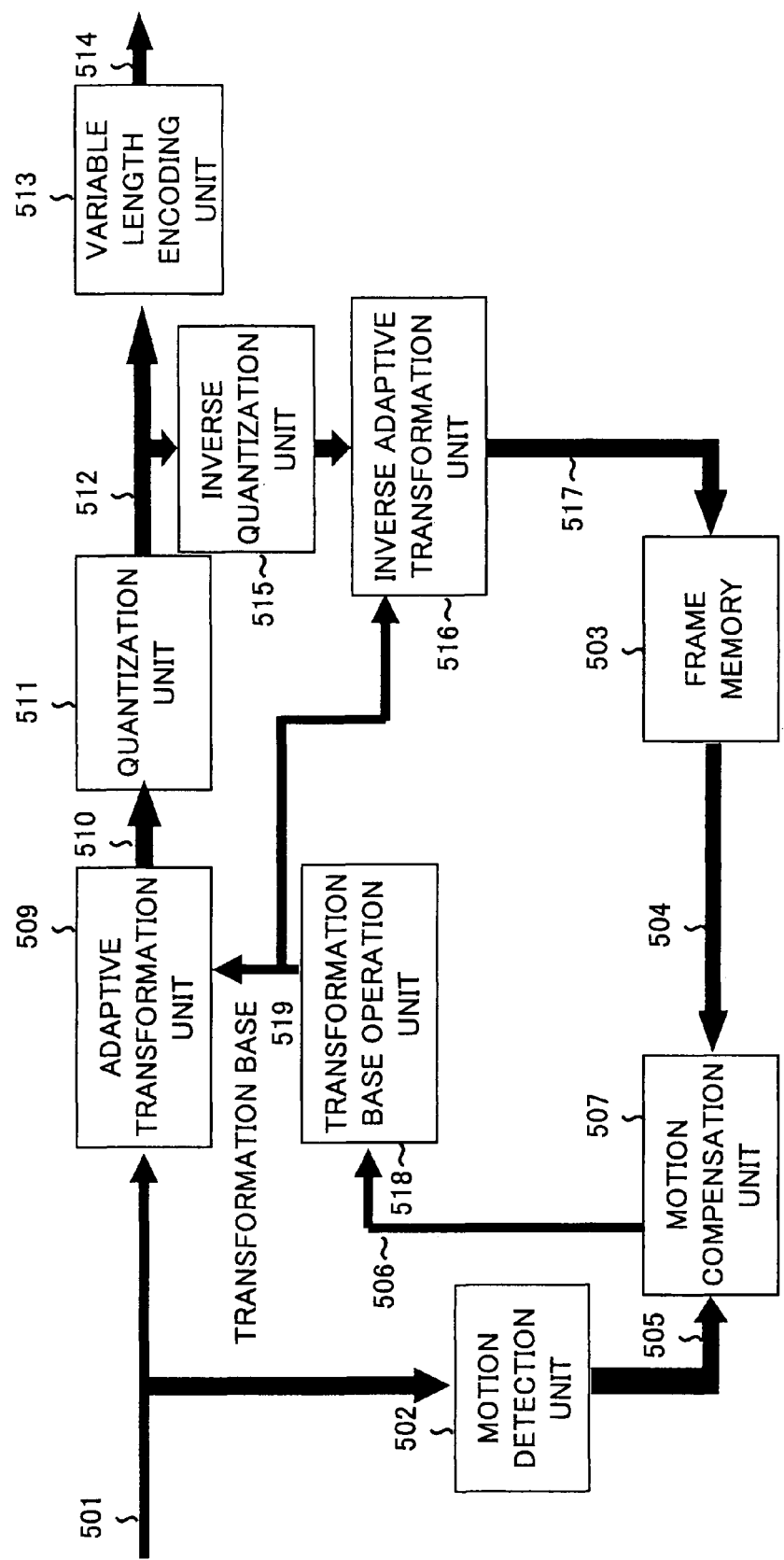
FIG. 26 is a schematic diagram showing an image encoding apparatus according to the fifth embodiment of the present invention.
Figure 27:
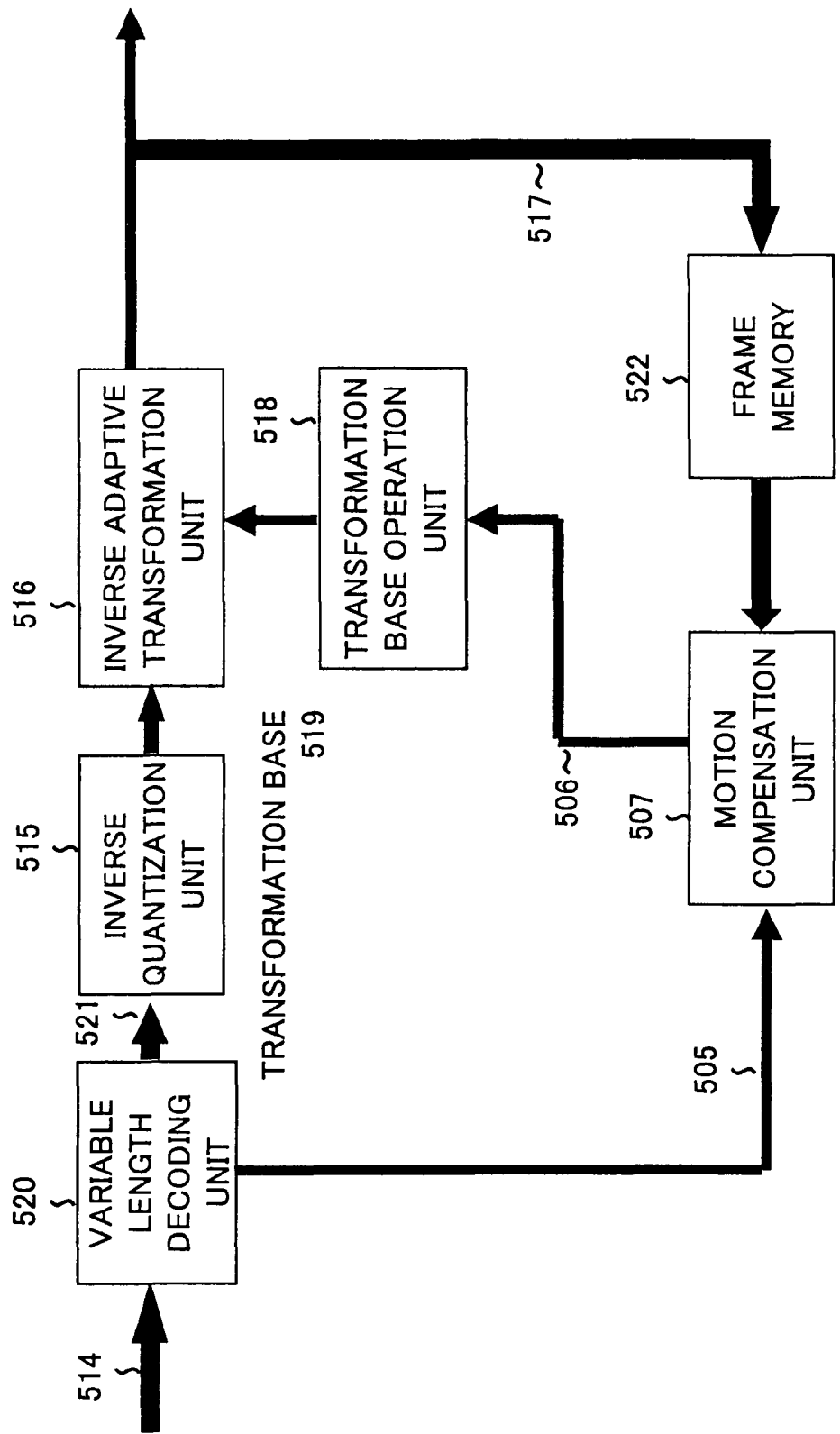
FIG. 27 is a schematic diagram showing an image decoding apparatus according to the fifth embodiment of the present invention.

The image encoding apparatus according to this embodiment is constructed as showed in FIG. 26, for example, and the image decoding apparatus according to this embodiment is constructed as showed in FIG. 27, for example. In this embodiment, an optimum transformation base for the predicted image is obtained using a high correlation between the predicted image obtained by the motion compensation inter-frame prediction and the image to be encoded (the current macro block), and the optimum transformation base is directly applied to the image to be encoded. That is, an intra-frame signal, instead of the predicted remainder signal, is directly encoded by the orthogonal transformation. Accordingly, since the transformation coefficients of the current macro block signal are concentrated near the principal axis, even the intra-frame signal can encode the image to be encoded with a high efficiency. Additionally, the predicted image is common to both the image encoding apparatus and the image decoding apparatus, and both apparatuses can generate the orthogonal transformation base following the same procedure. It is not necessary to transmit the base data.

In the image encoding apparatus showed in FIG. 26, the input image signal 501 indicates the signal of a frame image in a time series of frame images (the frame image that is an object of encoding corresponds to the current frame of FIG. 3). The current frame is encoded by a macro block by the following procedure. The current macro block is transferred to the motion detection unit 502 that detects the motion vector 505. The motion compensation unit 507 retrieves the predicted image 506 of each macro block from the partially decoded image 517 stored in the frame memory 503.

What is different from the other embodiments is that, in this embodiment, the predicted image 506 is transmitted, without being subtracted from the current macro block, to the transformation base operation unit 518 and used for the generation of the transformation base 519 that is used to encode the current macro block.

The transformation base operation unit 518 generates a KL (Karhunen-Loeve) transformation base using the predicted image 506 as a source. KL transformation generates the optimum, from the standpoint of power concentration, normalized orthogonal transformation from a signal that complies with stationary probability process. Accordingly, in the case of an image signal that is not stationary, it is necessary to obtain the KL transformation base for each transformation and transmit the KL transformation base to the image decoding apparatus so that the image decoding apparatus can use the same base. Since the KL transformation is obtained based on the predicted image, it is not necessary to transmit the KL transformation base to the image decoding apparatus. In general, the predicted image 506 is extracted as a pattern that is similar to the current macro block based on the motion compensation inter-frame prediction algorithm. That is, it is probable that the signal distribution of the predicted image 506 is substantially similar to that of the current macro block. From this standpoint, if the KL transformation based on the predicted image is used instead of DCT, the power concentration of the transformation coefficient of the current macro block can be increased. In other words, the signal can be represented by fewer transformation coefficients.

The current macro block is converted into orthogonal transformation coefficient data 510 by the adaptive transformation unit 509 using the KL transformation base of the predicted image 506. The orthogonal transformation coefficient data 510 is quantized by the quantization unit 511, scanned and encoded into a run-length code by the variable length encoding unit 513, and multiplexed on the compressed stream for transmission. The motion vector 505 is also multiplexed on the compressed stream 514 by a macro block and transmitted. The quantized coefficient 512 is partially decoded through the inverse quantization unit 515 and the inverse adaptive transformation unit 516, and the reproduced image 517 that is identical to the reproduced image of the image decoding apparatus is generated. The reproduced image 517 is stored in the frame memory 503 and used for the prediction of the next frame.

The image decoding apparatus showed in FIG. 27 operates in the following manner.

In the case of this image decoding apparatus, in response to reception of the compressed stream 514, the variable length decoding unit 520 detects a sync word indicating the top of each frame, and then, reproduces the motion vector 505 and the quantized orthogonal transformation coefficient 521 of each macro block. The motion vector 505 is transferred to the motion compensation unit 507. The motion compensation unit 507, in the same manner in which that of the image encoding apparatus, retrieves a portion of image that has moved for the motion vector 505 from the frame memory 522 (used in the same manner as the frame memory 503 is used) as the predicted image 506.

The quantized orthogonal transformation coefficient 521 is decoded through the inverse quantization unit 515 and the inverse adaptive transformation unit 516, and makes the decoded image 517. The transformation base operation unit 518, in the same manner of the image encoding apparatus, obtains the KL transformation base using the predicted image 506 as a source and outputs it as the transformation base 519. The inverse adaptive transformation unit 516 performs an inverse transformation on the transformation coefficient based on the transformation base 519 and reproduces a signal in the image space. The decoded image 517 is output to the display device at a predetermined timing and displayed on it.

Further the six embodiment of the present invention will be described below.

Figure 28:
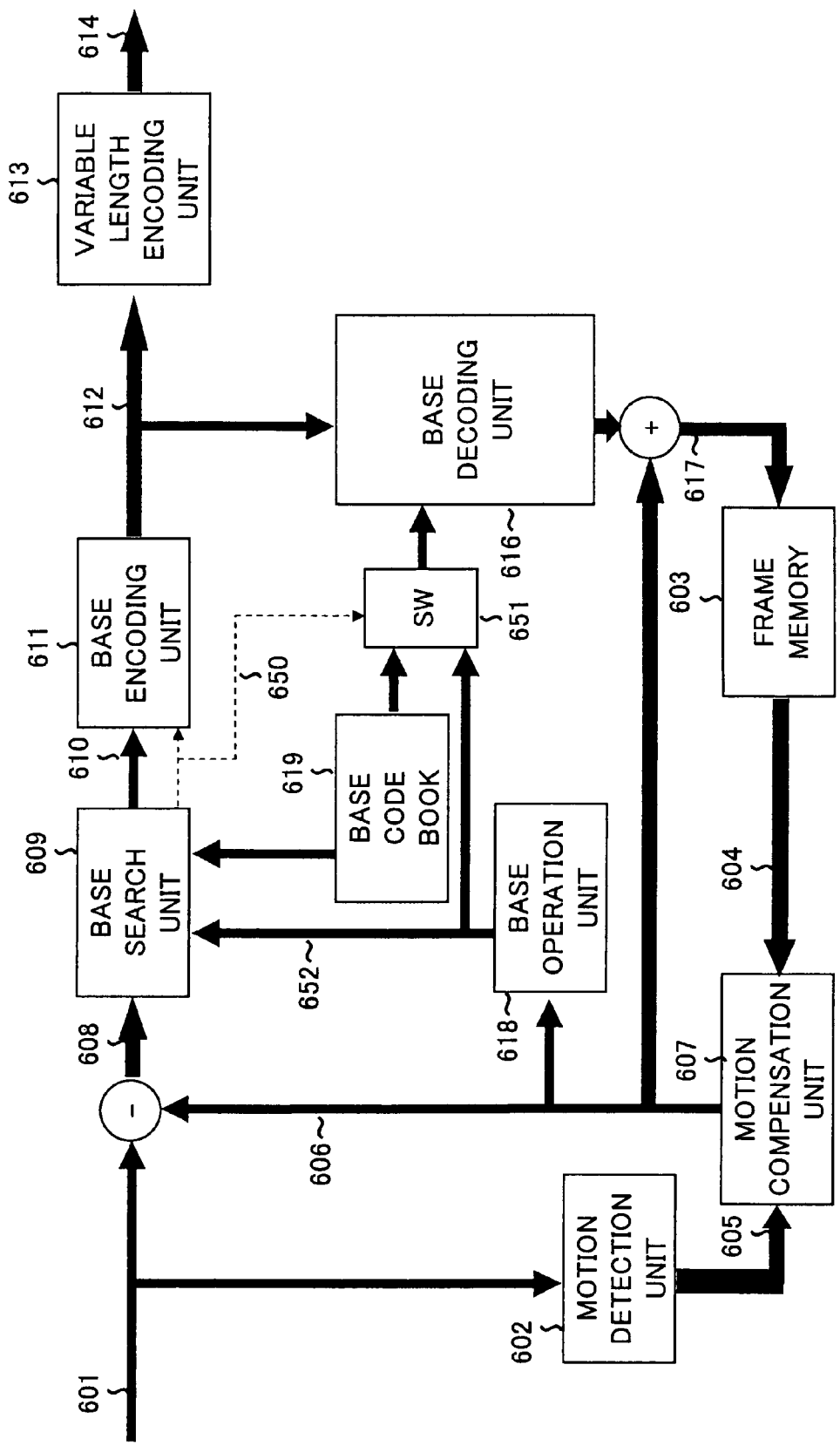
FIG. 28 is a schematic diagram showing an image encoding apparatus according to the sixth embodiment of the present invention.
Figure 29:
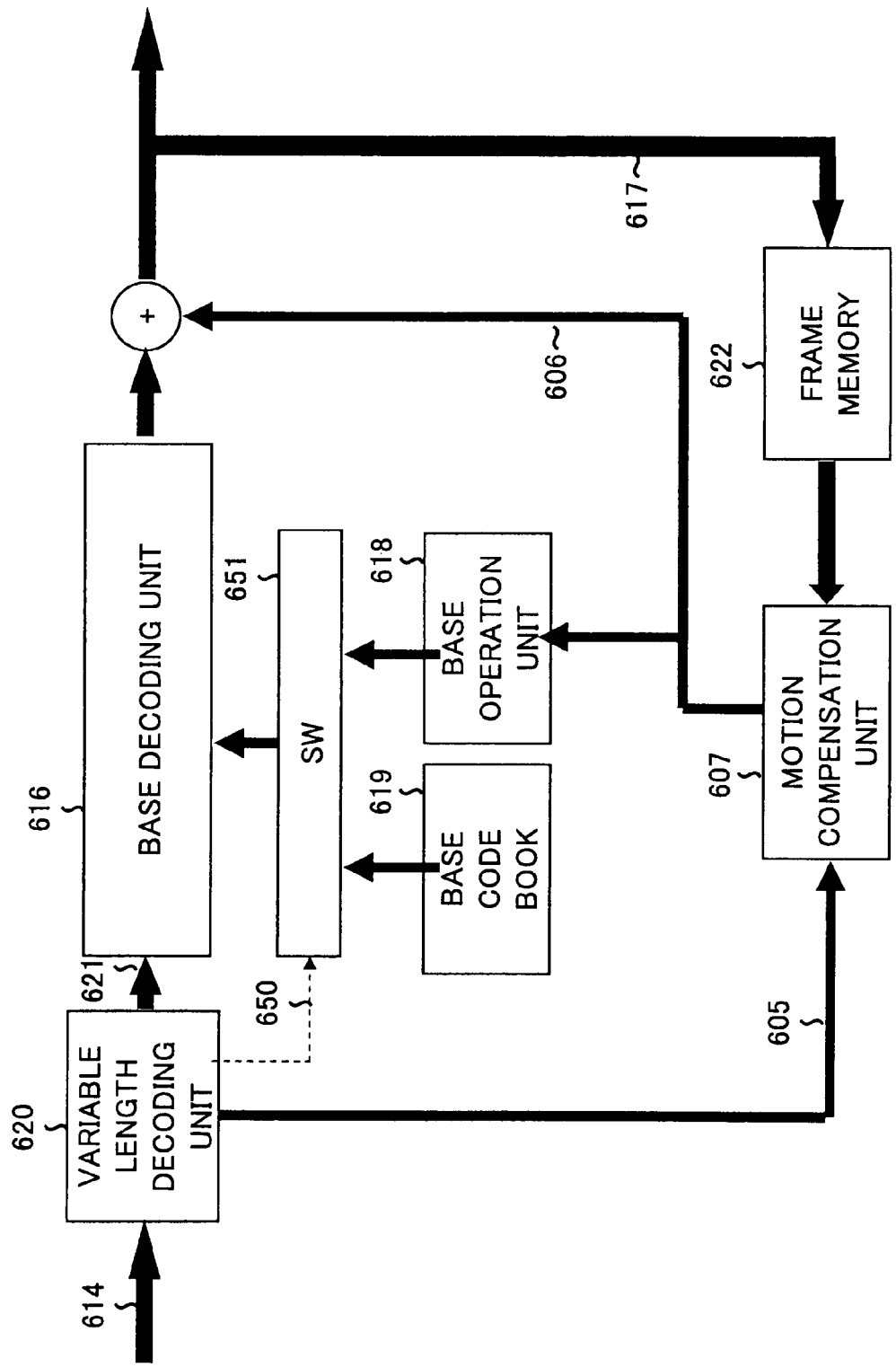
FIG. 29 is a schematic diagram showing an image decoding apparatus according to the sixth embodiment of the present invention.

The image encoding apparatus according to this embodiment is constructed as showed in FIG. 28, for example, and the image decoding apparatus according to this embodiment is constructed as showed in FIG. 29, for example. This embodiment relates to an apparatus that encodes and decodes an image by encoding method to which a technique called "Matching Pursuits" is applied and introduces an adaptive base reflecting the signal pattern of the predicted image as described in connection with the previous embodiments. According to "Matching Pursuits", an image signal f that is the object of encoding can be represented as the following formula 2 using an over-complete base set $g_k$ provided in advance.

$$f = \sum_{n=0}^{m-1} \langle R_n f, g_{k_n} \rangle g_{k_n} + R_m f \qquad \text{(Formula 2)}$$

where "n" is the number of base search steps; "$R_n f$" is a signal for which a base is searched in the $n^{th}$ search step (hereinafter, called the $n^{th}$ partial signal waveform); and "$g_{k_n}$" is a base that maximizes an inner product with $R_n f$. "$R_m f$" is a remaining component for which a base is searched in the $m^{th}$ search step. That is, the more the number of steps is, the more accurate the signal f is represented. The signal that is the object of the $n+1^{th}$ search step is as follows.

$$R_n f - \langle R_n f, g_{k_n} \rangle g_{k_n} \qquad \text{(Formula 3)}$$

This means that the more the number of bases is, the more accurately the signal f can be represented. "$R_n F$" is a signal waveform defined in a predetermined window range centered at an arbitral position in the image. The following information is encoded for each search step: an index indicating "g" (since "$g_k$" is commonly used by the encoding side and the decoding side, only an index needs to be exchanged to identify a base), an inner product (similarity information)

$$\langle R_n f, g_{k_n} \rangle \qquad \text{(Formula 4)}$$

(corresponding to a base coefficient), position information $p=(x_k, y_k)$ in a screen of the partial signal waveform $R_n f$.

According to this representation of the image signal and the encoding method, the more the number of bases is, that is, the more the number of search steps is, the more the amount of code becomes, and the less the distortion becomes.

In the image encoding apparatus showed in FIG. 28, an input image signal is a signal of a frame image in a time series of image frames (the frame image that is the object of encoding corresponds to the current frame of FIG. 3). The current frame is encoded in the following procedure. The current frame is transferred to the motion detection unit 602, and the motion vector 605 is detected by a macro block. The motion compensation unit 607 retrieves the predicted image 606 of the current frame from the partially decoded image 604 stored in the frame memory 603 using the motion vector 605. The predicted remainder signal 608 is obtained as the difference between the predicted image 606 and the current frame (the input image signal 601).

Subsequently, the base search unit 609 generates a base parameter (hereinafter referred to as "atom") 610 for the predicted remainder signal 608 based on the above "Matching Pursuits" algorithm. The base set $g_k$ is stored in a base codebook 619. If one can find a base that can accurately represent the partial signal waveform in the initial search step, the one can represent the partial signal waveform with a few atoms, that is, a small amount of codes, to such an extent that the base accurately represent the partial signal waveform. In addition, because the over-complete base $g_k$ is used from the initial stage, any vector of which waveform pattern satisfies linearly independent from the vectors included in $g_k$ and of which a norm is one (1) can be used as a new base.

Accordingly, this embodiment is constructed so that a waveform pattern of image signals included in the predicted image 606 can be used as a new base. As described above, the pattern of the predicted image signal sometimes substantially correlates to that of the predicted remainder signal; in the case where the motion compensation prediction fails in the outline region of an object, an edge pattern similar to the predicted image appears in the predicted remainder signal, for example. Thus, if a base is generated from the predicted image, the number of potentially usable bases increases, and the predicted remainder signal can be efficiently represented.

Specifically, the base operation unit 618 generates a candidate of a new base $h_j$ 652.

$$h_j = P_j / |P_j| \qquad \text{(Formula 5)}$$

where "$P_j$" is a waveform vector generated from the partially predicted image, and "$|P_j|$" is a norm of $P_j$. The partially predicted image means a partial signal waveform that is located at the same position as the partial signal waveform of the object of base search. Since the partial predicted image is located at the same position in the screen as the position information of an atom that is to be encoded, the image decoding apparatus does not need additional information to identify the position of the partial predicted image. The following may be used as $P_j$:

1) a waveform pattern obtained by subtracting DC component from the partial predicted image;
2) a waveform pattern obtained by extracting edge component from the partial predicted image (extracted by effecting a Sobel operator, for example, in the horizontal or vertical directions);
3) a difference waveform pattern between the partially predicted image and a pattern to be obtained by horizontally shifting the partially predicted image by ¼ pixel;
4) a difference waveform pattern between the partially predicted image and a pattern to be obtained by vertically shifting the partial predicted image by ¼ pixel;
5) a difference waveform pattern between the partial predicted image and a pattern to be obtained by horizontally shifting the partial predicted image by ½ pixel;

6) a difference waveform pattern between the partial predicted image and a pattern to be obtained by vertically shifting the partial predicted image by ½ pixel; and
7) a waveform pattern obtained by smoothing the partial predicted image.

A new base set $h_j$ is generated by the formula 5 using $P_j$ based on the partial predicted image. Since $h_j$ is generated using only signals included in the predicted image 606, it is not necessary to transmit base vectors. One needs to transmit only the index of $h_j$ instead of $g_k$. It is possible to increase the candidates for a new base without transmitting additional amount of codes.

Flag information 650 for identifying whether to use $g_k$ or $h_j$ may be encoded.

Though it is not showed in the drawings, if one desires to use an $h_j$ that fits a partial signal waveform with other arbitral partial signal waveforms, the one can replace a base included in $g_k$ that is not used frequently with the $h_j$. According to the above procedure, the base search unit 609 outputs an atom parameter 610 including an index of $g_k$ or $h_j$, an inner product of the partial signal waveform and the base, and position of the partial signal waveform, in addition to the flag information 650, to the base encoding unit 611. The base encoding unit 611 quantizes the atom parameter 610, transfers the encoded data to the variable length encoding unit 613, and additionally, inputs the encoded data to the base decoding unit 616. The base decoding unit 616 reproduces the image signal using a base pattern encoded from $g_k$ or $h_j$ that are switched by flag information 650 and the switch 651. Subsequently, the reproduced image signal is added to the predicted image 606 to generate the partially decoded image 617, which is stored in the frame memory 603 and used for the compensation prediction of the next frame.

The image decoding apparatus showed in FIG. 29 operates in the following manner.

In this image decoding apparatus, in response to reception of the compressed stream 614, the variable length decoding unit 620 detects a sync word indicating the top of each frame, and reproduces the motion vector 605 and the atom parameter 621 by a macro block. The motion vector 605 is transferred to the motion compensation unit 607, and the motion compensation unit 607 retrieves an image portion that moved for the motion vector 605 from the frame memory 622 (used as the frame memory 603) as the predicted image 606.

The atom parameter 621 is decoded by the base decoding unit 616. A base to be used for decoding is determined based on the flag information 650 by switching the base codebook $g_k$ 619 originally provided and the base $h_j$ generated from the predicted image 606. When $h_j$ is used, the base operation unit 618 generates $h_j$ from the predicted image 606 complying with the same rule as the encoding side.

The output of the base decoding unit 616 is added to the predicted image 606 to make the decoded image 617. The decoded image 617 is stored in the frame memory 622 and used for the compensation of upcoming frames. The decoding image 617 is output to the display device at a predetermined timing to reproduce the image.

INDUSTRIAL APPLICABILITY

As described above, according to the present invention claimed in the claims 1-107, a signal that is an object to be encoded can be transformed and encoded using a transformation base matching to a characteristic of the signal, and the encoded signal can be transformed using the same transformation base after decoding the encoded signal. As a result, the encoding and decoding of a signal becomes more efficient.

The invention claimed is:

1. A method of encoding an object signal in compliance with a transformation rule that is derived by an image encoding apparatus, comprising:
   a first step of obtaining, by a motion compensation unit of the image encoding apparatus, a reference signal correlating to said object signal;
   a second step of deriving, by a transformation base operation unit of the image encoding apparatus, a transformation base that forms said transformation rule based on a characteristic of the obtained reference signal;
   a third step of encoding, by a adaptive transformation unit of the image encoding apparatus, said object signal in compliance with the transformation rule formed by the derived transformation base; and
   wherein the encoded object signal is transmitted from the image encoding apparatus without the derived transformation base.

2. The method as claimed in claim 1, wherein said reference signal is identical to a signal that is to be obtained when the object signal encoded by the method is decoded.

3. The method as claimed in claim 1, wherein said object signal is an image signal indicating information about an image.

4. The method as claimed in claim 3, wherein said image signal is a predicted remainder signal obtained by motion compensation prediction method from an input original image signal.

5. The method as claimed in claim 3, wherein said reference signal is a predicted image signal obtained by motion compensation prediction from said input original image signal.

6. The method as claimed in claim 1, wherein said transformation base is generated based on a characteristic of said reference signal.

7. The method as claimed in claim 6, wherein, in said second step, a new transformation base is generated by modifying a transformation base predetermined as a reference based on a characteristic in signal value distribution of said reference signal.

8. The method as claimed in claim 3, wherein, in said second step, a new transformation base is generated by modifying DCT transformation base based on a characteristic in brightness distribution of a reference signal correlated to said image signal.

9. The method as claimed in claim 8, wherein, in said second step,
   a relationship between said brightness distribution of reference signal and said DCT transformation base is obtained; and
   said new transformation base is generated by modifying said DCT transformation base based on said relationship.

10. The method as claimed in claim 9, wherein, in said second step,
    a plurality of waveform patterns that can appear as a characteristic in brightness distribution of a reference signal are prepared;
    one of said plurality of waveform patterns is selected in accordance with a similarity with a characteristic in brightness distribution of said reference signal; and
    a new transformation base is generated by modifying DCT transformation based on a relationship between the selected waveform pattern and DCT transformation base.

11. The method as claimed in claim 1, wherein, in said second step, a transformation base to be used in said third step is selected from a plurality of predetermined transformation bases based on a characteristic of said reference signal.

12. The method as claimed in claim 11, wherein, in said second step,
   a relationship between each one of the plurality of predetermined transformation bases and a characteristic in signal value distribution of said reference signal is obtained; and
   a transformation base of which a characteristic in signal value distribution satisfies a predetermined standard is selected.

13. The method as claimed in claim 3, wherein, in said second step,
   a similarity between a base vector indicating a characteristic of each one of a plurality of predetermined transformation bases and a characteristic in brightness distribution of a reference signal correlating to said image signal; and
   a transformation base having said base vector of which similarity with said characteristic in brightness distribution of said reference signal satisfies a predetermined standard is selected from the plurality of transformation bases.

14. The method as claimed in claim 13, wherein the plurality of transformation bases includes DCT base; and
   in said second step, either a transformation base selected from the plurality of transformation bases other than DCT base based on said similarity or DCT base whichever exhibits better efficiency in encoding is selected.

15. The method as claimed in claim 1, wherein, in said second step, said transformation base is generated based on said reference signal; and
   a transformation base to be used in said third step is selected from a plurality of transformation bases and the generated transformation base based on said characteristic of said reference signal.

16. The method as claimed in claim 15, wherein, in the case where the generated transformation base is selected as said transformation base to be used in said third step, the generated transformation base is added to said plurality of transformation bases.

17. The method as claimed in claim 16, wherein a transformation base determined based on said characteristic of said reference signal and a mutual relationship with another one of said plurality of transformation bases is deleted from said plurality of transformation bases.

18. The method as claimed in claim 3, wherein, in said second step, a new transformation base is generated by modifying DCT transformation base based on a characteristic of brightness distribution of said reference signal correlated to said image signal;
   a similarity between a base vector and said characteristic of brightness distribution of said reference signal is obtained, said base vector indicating a feature of each one of the plurality of predetermined transformation bases and the generated transformation base; and
   a transformation base having said base vector of which similarity with said characteristic of brightness distribution of said reference signal satisfies a first standard is selected from said plurality of transformation bases and the generated transformation base to use in said third step.

19. The method as claimed in claim 18, wherein, in the case where the generated transformation base is selected as a transformation base to be used in said third step, the generated transformation step is added to said plurality of transformation bases; and
   a transformation base having said base vector said similarity of which with said characteristic of brightness distribution of said reference signal satisfies a second standard is deleted from said plurality of transformation bases.

20. The method as claimed in claim 15, wherein one of said plurality of transformation bases is selected based on said characteristic of said reference signal; and
   said object signal is encoded using the selected one of said plurality of transformation bases and the generated transformation base, and either the selected one of said plurality of transformation bases or the generated transformation base is selected based on results of encoding.

21. The method as claimed in claim 15, wherein, when a transformation base to be used in said third step is selected from said plurality of transformation bases and the generated transformation base, one of said plurality of transformation bases is prioritized.

22. The method as claimed in claim 15, wherein, in the case where the generated transformation base is selected, the generated transformation base is encoded with said object signal.

23. The method as claimed in claim 16, wherein the generated transformation base and information to identify the deleted one of said plurality of transformation bases are encoded with said object signal.

24. The method as claimed in claim 3, wherein said reference signal is a predicted image signal obtained from input original image signal by motion compensation prediction; and
   the input original image signal makes said object signal.

25. The method as claimed in claim 24, wherein, in said second step, a Karhunen-Loeve transformation base obtained from a predicted image being a reference signal as a source is generated as a transformation base to be used in said third step.

26. The method as claimed in claim 1, wherein a partial signal waveform of said object signal is identified, and said partial signal waveform is converted into similarity information indicating a similarity between said partial signal waveform and a waveform vector making a transformation vector;
   information to identify said waveform vector, said similarity information, and a position of said partial signal waveform in said object signal are encoded; and
   in said second step, a waveform vector that makes a transformation base is generated based on a characteristic of a partial signal of said reference signal corresponding to said partial signal waveform of said object signal.

27. The method as claimed in claim 26, wherein a waveform vector to be used as a transform base is selected based on a similarity relationship between each waveform vector included in a predetermined group of wave vectors and the generated waveform vector and said partial signal waveform.

28. The method as claimed in claim 26, wherein said similarity information is based on an inner product between said partial signal waveform and a waveform vector.

29. The method as claimed in claim 26, wherein information identifying said waveform vector to be encoded includes flag information indicating which the waveform vector included in the group of waveform vectors or the generated waveform vector is selected.

30. An apparatus for encoding an object signal in compliance with a transformation rule, comprising:
   a first unit that obtains a reference signal correlating to said object signal;
   a second unit that derives a transformation base that forms said transformation rule based on a characteristic of the obtained reference signal;

a third unit that encodes said object signal in compliance with the transformation rule formed by the derived transformation base; and wherein the object signal is transmitted without the derived transformation base.

31. The apparatus as claimed in claim 30, wherein said reference signal is identical to a signal that is to be obtained when the object signal encoded by the apparatus is decoded.

32. The apparatus as claimed in claim 30, wherein said object signal is an image signal indicating information about an image.

33. The apparatus as claimed in claim 32, wherein said image signal is a predicted remainder signal obtained by motion compensation prediction method from an input original image signal.

34. The apparatus as claimed in claim 32, wherein said reference signal is a predicted image signal obtained by motion compensation prediction from said input original image signal.

35. The apparatus as claimed in claim 30, wherein said second unit generates said transformation base based on a characteristic of said reference signal.

36. The apparatus as claimed in claim 35, wherein said transformation base generation unit generates a new transformation base by modifying a transformation base predetermined as a reference based on a characteristic in signal value distribution of said reference signal.

37. The apparatus as claimed in claim 32, wherein said second unit generates a new transformation base by modifying DCT transformation base based on a characteristic in brightness distribution of a reference signal correlated to said image signal.

38. The apparatus as claimed in claim 30, wherein, said second unit selects a transformation base to be used by said third unit from a plurality of predetermined transformation bases based on a characteristic of said reference signal.

39. The apparatus as claimed in claim 38, wherein said base selecting unit obtains a relationship between each one of the plurality of predetermined transformation bases and a characteristic in signal value distribution of said reference signal and selects a transformation base of which a characteristic in signal value distribution satisfies a predetermined standard.

40. The apparatus as claimed in claim 32, wherein said second unit obtains a similarity relationship between a base vector indicating a characteristic of each one of a plurality of predetermined transformation bases and a characteristic in brightness distribution of a reference signal correlating to said image signal; and said second unit selects a transformation base having said base vector of which similarity with said characteristic in brightness distribution of said reference signal satisfies a predetermined standard from the plurality of transformation bases.

41. The apparatus as claimed in claim 40, wherein the plurality of transformation bases includes DCT base; and said base selecting unit selects either a transformation base selected from the plurality of transformation bases other than DCT base based on said similarity or DCT base whichever exhibits better efficiency in encoding.

42. The apparatus as claimed in claim 30, wherein said second unit further comprises: base generating unit that generates said transformation base based on a characteristic of said reference signal; and base selecting unit that selects a transformation base to be used by said third unit from a plurality of transformation bases and the generated transformation base based on said characteristic of said reference signal.

43. The apparatus as claimed in claim 42, wherein, in the case where the generated transformation base is selected as said transformation base to be used by said third unit, the generated transformation base is added to said plurality of transformation bases.

44. The apparatus as claimed in claim 43, wherein a transformation base determined based on said characteristic of said reference signal and a mutual relationship with another one of said plurality of transformation bases is deleted from said plurality of transformation bases.

45. The apparatus as claimed in claim 32, wherein said second unit further comprises:

base generating unit that generates a new transformation base by modifying DCT transformation base based on a characteristic of brightness distribution of said reference signal correlated to said image signal;

base selecting unit that obtains a similarity relationship between a base vector and said characteristic of brightness distribution of said reference signal, said base vector indicating a feature of each one of the plurality of predetermined transformation bases and the generated transformation base, and selects a transformation base having said base vector of which similarity relationship with said characteristic of brightness distribution of said reference signal satisfies a first standard from said plurality of transformation bases and the generated transformation base to be used by said third unit.

46. The apparatus as claimed in claim 42, wherein said base selecting unit further comprises:

a first unit that selects one of said plurality of transformation bases based on said characteristic of said reference signal; and a second unit that encodes said object signal using the selected one of said plurality of transformation bases and the generated transformation base, and selects either the selected one of said plurality of transformation bases or the generated transformation base based on results of encoding.

47. The apparatus as claimed in claim 42, wherein said base selecting unit, when selecting a transformation base to be used by said third unit from said plurality of transformation bases and the generated transformation base, prioritizes one of said plurality of transformation bases.

48. The apparatus as claimed in claim 42, wherein, in the case where the generated transformation base is selected, the generated transformation base is encoded with said object signal.

49. The apparatus as claimed in claim 43, wherein the generated transformation base and information to identify the deleted one of said plurality of transformation bases are encoded with said object signal.

50. The apparatus as claimed in claim 32, wherein said reference signal makes a predicted image signal obtained from input original image signal by motion compensation prediction; and the input original image signal makes said object signal.

51. The apparatus as claimed in claim 50, wherein said second unit generates a Karhunen-Loeve transformation base obtained from a predicted image making a reference signal as a source as a transformation base to be used by said third unit.

52. The apparatus as claimed in claim 30, wherein a partial signal waveform of said object signal is identified, and said partial signal waveform is converted into similarity information indicating a similarity between said partial signal waveform and a waveform vector making a transformation vector;

information to identify said waveform vector, said similarity information, and a position of said partial signal waveform in said object signal are encoded; and said second unit further comprises base generating unit that generates a waveform vector that makes a transformation base based on a characteristic of a partial signal of said reference signal corresponding to said partial signal waveform of said object signal.

53. The apparatus as claimed in claim 52, wherein a waveform vector to be used as a transform base is selected based on a similarity relationship between each waveform vector included in a predetermined group of wave vectors and the generated waveform vector and said partial signal waveform.

54. The apparatus as claimed in claim 52, wherein said similarity information is based on an inner product between said partial signal waveform and a waveform vector.

55. The apparatus as claimed in claim 52, wherein information identifying said waveform vector to be encoded includes flag information indicating which the waveform vector included in the group of waveform vectors or the generated waveform vector is selected.

56. A method of decoding an encoded signal and transforming the decoded signal in compliance with a transformation rule derived by an image encoding apparatus to reproduce an image signal, comprising:

a first step of deriving, by a transformation base operation unit of the image decoding apparatus, a transformation base that forms said transformation rule based on the decoded signal;

a second step of transforming, by inverse adaptive transformation unit of the image decoding apparatus, the decoded signal in compliance with said transformation rule based on the derived transformation base to reproduce said image signal; and wherein the encoded signal is transmitted from the image encoding apparatus without the transformation base upon which the encoded signal has been transformed.

57. The method as claimed in claim 56, wherein, in said first step, a signal correlated to the decoded signal is obtained as a reference signal; and said transformation base is generated based on a characteristic of the obtained reference signal.

58. The method as claimed in claim 57, wherein said reference signal is identical to a signal correlating to an object signal before encoding.

59. The method as claimed in claim 56, wherein said encoded signal is an encoded image signal where information about an image is encoded.

60. The method as claimed in claim 59, wherein said encoded image signal making said encoded signal is an encoded predicted remainder signal obtained by encoding a predicted remainder signal obtained from said image signal by motion compensation prediction method.

61. The method as claimed in claim 59, wherein said reference signal is a predicted image signal obtained from the decoded image signal by the motion compensation prediction method.

62. The method as claimed in claim 57, wherein, in said first step, a new transformation base is generated by modifying a transformation base satisfying a predetermined standard based on a characteristic of signal value distribution of said reference signal.

63. The method as claimed in claim 62, wherein said encoded signal makes an encoded image signal in connection with an image;

in the first step, a new transformation base is generated by modifying DCT transformation base based on a characteristic of brightness distribution making a characteristic of signal value distribution of said reference signal.

64. The method as claimed in claim 63, wherein, in said first step, a relationship between a characteristic of brightness distribution of said reference signal and DCT transformation base is obtained;

a new transformation base is generated by modifying DCT transformation base based on said relationship.

65. The method as claimed in claim 64, wherein, in said first step, a plurality of waveform patterns that can appear as a characteristic in brightness distribution of said reference signal are predetermined;

one of said plurality of waveform patterns is selected in accordance with a similarity relationship with a characteristic in brightness distribution of said reference signal; and a new transformation base is generated by modifying DCT transformation base based on a relationship between the selected waveform pattern and DCT transformation base.

66. The method as claimed in claim 56, wherein, in said first step, a transformation base to be used in said second step is selected from a plurality of predetermined transformation bases based on a characteristic of said reference signal.

67. The method as claimed in claim 66, wherein, in said first step, a relationship between each of said plurality of transformation bases and the characteristic of signal value distribution of said reference signal is determined; and a transformation base the determined relationship of which with the characteristic of signal distribution of said reference signal is selected.

68. The method as claimed in claim 67, wherein said encoded signal is an encoded image signal in connection with an image;

in said first step, a similarity relationship between a base vector indicating said characteristic and said characteristic of signal value distribution of said reference signal is obtained for each one of said plurality of transformation base; and a transformation base having said base vector the similarity relationship of which with said characteristic of brightness distribution of said reference signal satisfies a predetermined standard is selected from said plurality of transformation bases.

69. The method as claimed in claim 56, wherein said encoded signal makes an encoded original, image signal that is obtained by encoding an original image;

said reference signal makes a predicted image signal that is obtained by motion compensation prediction method from said encoded original image signal; and in said first step, a Karhunen-Loeve transformation base source of which is said predicted image signal making said reference signal is generated as a transformation base to be used in said second step.

70. The method as claimed in claim 56, wherein, in the case where information indicating that a waveform vector that makes a transformation base generated based on a characteristic of a partial signal of a predetermined reference signal has been used when an object signal is encoded, similarity information indicating a similarity between said waveform vector and said partial signal waveform of said object signal, and a position of said partial signal waveform in said object signal are included in a signal that is obtained by decoding said encoded signal, in said first step, a waveform vector making a transformation base, which is available from said encoded signal, is generated based on a characteristic of said partial signal of said reference signal corresponding to a predetermined reference signal used when said signal is encoded;

in said second step, said partial signal waveform at the position in said object signal is reproduced by transforming said similarity information in compliance with said transformation rule based on the generated waveform vector.

71. The method as claimed in claim 70, wherein a signal that is obtained by decoding said encoded signal includes flag information indicating which a waveform vector or a predetermined waveform vector group is used, said waveform vector making a transformation base being generated, when said object signal is encoded, based on a characteristic of said partial signal of a predetermined reference signal;

in said first step, in the case where said flag information indicates that said waveform vector group is used, a waveform vector identified by information identifying the used waveform vector is selected from said plurality of waveform vector groups;

in said second step, said similarity information is transformed in compliance with said transformation rule based on the selected waveform vector, and a partial signal waveform a said position in said object signal is reproduced.

72. An apparatus for decoding an encoded signal and transforming the decoded signal in compliance with a transformation rule to reproduce an image signal, comprising:

a first unit that derives a transformation base that forms said transformation rule based on the decoded signal;

a second unit that transforms the decoded signal in compliance with said transformation rule based on the derived transformation base to reproduce said image signal; and wherein the encoded object signal is transmitted without the derived transformation base.

73. The apparatus as claimed in claim 72, wherein said first unit obtains a signal correlated to the decoded signal as a reference signal and generates said transformation base based on a characteristic of the obtained reference signal.

74. The apparatus as claimed in claim 73, wherein said reference signal is identical to a signal correlating to an object signal before encoding.

75. The apparatus as claimed in claim 72, wherein said encoded signal is an encoded image signal where information about an image is encoded.

76. The apparatus as claimed in claim 75, wherein said encoded image signal making said encoded signal is an encoded predicted remainder signal obtained by encoding a predicted remainder signal obtained from said image signal by motion compensation prediction method.

77. The apparatus as claimed in claim 75, wherein said reference signal is a predicted image signal obtained from the decoded image signal by the motion compensation prediction method.

78. The apparatus as claimed in claim 72, wherein said base generating unit generates a new transformation base by modifying a transformation base satisfying a predetermined standard based on a characteristic of signal value distribution of said reference signal.

79. The apparatus as claimed in claim 78, wherein said encoded signal makes an encoded image signal in connection with an image;

said base generating unit generates a new transformation base by modifying DCT transformation base based on a characteristic of brightness distribution making a characteristic of signal value distribution of said reference signal.

80. The apparatus as claimed in claim 79, wherein said base generating unit obtains a relationship between a characteristic of brightness distribution of said reference signal and DCT transformation base, and generates a new transformation base by modifying DCT transformation base based on said relationship.

81. The apparatus as claimed in claim 80, wherein said base generating unit predetermines a plurality of waveform patterns that can appear as a characteristic in brightness distribution of said reference signal, selects one of said plurality of waveform patterns in accordance with a similarity relationship with a characteristic in brightness distribution of said reference signal, and generates a new transformation base by modifying DCT transformation base based on a relationship between the selected waveform pattern and DCT transformation base.

82. The apparatus as claimed in claim 72, wherein said first unit further comprises a base selecting unit that selects a transformation base to be used by said second unit from a plurality of predetermined transformation bases based on a characteristic of said reference signal.

83. The apparatus as claimed in claim 82, wherein said base selecting unit obtains a relationship between each of said plurality of transformation bases and the characteristic of signal value distribution of said reference signal, and selects a transformation base the relationship of which with the characteristic of signal distribution of said reference signal.

84. The apparatus as claimed in claim 83, wherein said encoded signal is an encoded image signal in connection with an image;

said base selecting unit obtains a similarity relationship between a base vector indicating said characteristic and said characteristic of signal value distribution of said reference signal for each one of said plurality of transformation base, and selects a transformation base having said base vector the similarity relationship of which with said characteristic of brightness distribution of said reference signal satisfies a predetermined standard from said plurality of transformation bases.

85. The apparatus as claimed in claim 72, wherein said encoded signal makes an encoded original image signal that is obtained by encoding an original image;

said reference signal makes a predicted image signal that is obtained by motion compensation prediction method from said encoded original image signal; and said first unit generates a Karhunen-Loeve transformation base source of which is said predicted image signal making said reference signal as a transformation base to be used in said second step.

86. The apparatus as claimed in claim 72, wherein, in the case where information indicating that a waveform vector that makes a transformation base generated based on a characteristic of a partial signal of a predetermined reference signal has been used when an object signal is encoded, similarity information indicating a similarity between said waveform vector and said partial signal waveform of said object signal, and a position of said partial signal waveform in said object signal are included in a signal that is obtained by decoding said encoded signal, said first unit generates a waveform vector making a transformation base, which is available from said encoded signal, based on a characteristic of said partial signal of said reference signal corresponding to a predetermined reference signal used when said signal is encoded; and said second unit reproduces said partial signal waveform at the position in said object signal by transforming said similarity information in compliance with said transformation rule based on the generated waveform vector.

87. The apparatus as claimed in claim 86, wherein a signal that is obtained by decoding said encoded signal includes flag information indicating which a waveform vector or a predetermined waveform vector group is used, said waveform vector making a transformation base being generated, when said object signal is encoded, based on a characteristic of said partial signal of a predetermined reference signal;

said first unit selects, in the case where said flag information indicates that said waveform vector group is used, a waveform vector identified by information identifying the used waveform vector from said plurality of waveform vector groups; and said second unit transforms said similarity information in compliance with said transformation rule based on the selected waveform vector, and reproduces a partial signal waveform at said position in said object signal.

88. A method of decoding an encoded signal and transforming the decoded signal in compliance with a transformation rule derived by an image decoding apparatus to reproduce an image signal, comprising:

deriving, by a transformation base operation unit of the image decoding apparatus, a transformation base that forms said transformation rule based on the decoded signal; and transforming, by an inverse adaptive transformation unit of the image decoding apparatus, the decoded signal in compliance with said transformation rule based on the derived transformation base to reproduce said image signal, wherein, in said deriving, a transformation base is selected from a plurality of predetermined transformation bases based on a characteristic of said reference signal, and a relationship between each of said plurality of transformation bases and the characteristic of signal value distribution of said reference signal is determined; and a transformation base, the determined relationship of which with the characteristic of signal distribution of said reference signal is selected, said encoded signal is an encoded image signal in connection with an image;

in said deriving, a similarity relationship between a base vector indicating said characteristic and said characteristic of signal value distribution of said reference signal is obtained for each one of said plurality of transformation base;

a transformation base having said base vector the similarity relationship of which with said characteristic of brightness distribution of said reference signal satisfies a predetermined standard is selected from said plurality of transformation bases, the plurality of transformation bases includes DCT base; and in said deriving, a transformation base to be used in said transforming is selected based on flag information obtained by decoding said encoded image signal indicating either DCT base or the plurality of transformation bases.

89. The method, as claimed in claim 88, wherein, in the case where the flag information indicates the plurality of transformation bases other than DCT base, one of the plurality of transformation bases other than said DCT base is selected based on the similarity relationship of said characteristic of brightness distribution of said reference signal.

* * * * *